United States Patent [19]
Jeng

[11] Patent Number: 5,892,768
[45] Date of Patent: Apr. 6, 1999

[54] 10/100-BASE ETHERNET TO T1/E1 HDSL CONVERTER AND METHOD OF OPERATION

[75] Inventor: Jack Ing Jeng, Alhambra, Calif.

[73] Assignee: Etherwan System, Inc., Irvine, Calif.

[21] Appl. No.: 712,735

[22] Filed: Sep. 12, 1996

[51] Int. Cl.$^6$ .................................................. H04L 12/413
[52] U.S. Cl. ................................................ 370/445; 370/466
[58] Field of Search ...................... 370/465, 466, 370/467, 469, 470, 476, 445, 446, 522, 523, 528, 472

[56] References Cited

U.S. PATENT DOCUMENTS

| | | | |
|---|---|---|---|
| 5,056,084 | 10/1991 | Le Corre | 370/466 |
| 5,263,028 | 11/1993 | Borgnis et al. | 370/465 |
| 5,521,924 | 5/1996 | Kakuma et al. | 370/466 |
| 5,640,605 | 6/1997 | Johnson et al. | 375/293 |

*Primary Examiner*—Chau Nguyen
*Attorney, Agent, or Firm*—Ladas & Parry

[57] ABSTRACT

Received Ethernet MII packets are converted to T1/E1 HDSL frames and received T1/E1 HDSL frames are converted into Ethernet MII packets. When Ethernet MII format 4 bit data packets are received they are converted into 8 bit data packets, each 8 bit data packet having an associated signal bit. For T1, a series of twenty-one 8 bit data packets and associated signal bit are combined with three pass bits into a 192 bit T1 HDSL frame. The series of twenty-one multiple 8 bit packets and associated signal bit with three pass bits are transmitted in HDSL format. When T1 HDSL frames having a series of twenty-one 9 bit packets, each 9 bit packet including 8 data bits with an associated signal bit, and three pass bits, are received, the series of twenty-one 9 bit packets and three pass bits are converted into twenty-one groups of 9 bit packets, each 9 bit packet including an 8 bit data packet with an associated signal bit. Each 8 bit data packet is converted into a 4 bit data MII packet and the 4 bit data MII packet is transmitted in 10/100-Base Ethernet packet format. A similiar process occurs for E1 but with a series of twenty-seven 8 bit data packets and associated signal bit combined with five pass bits into a 256 bit E1 HDSL frame.

16 Claims, 39 Drawing Sheets

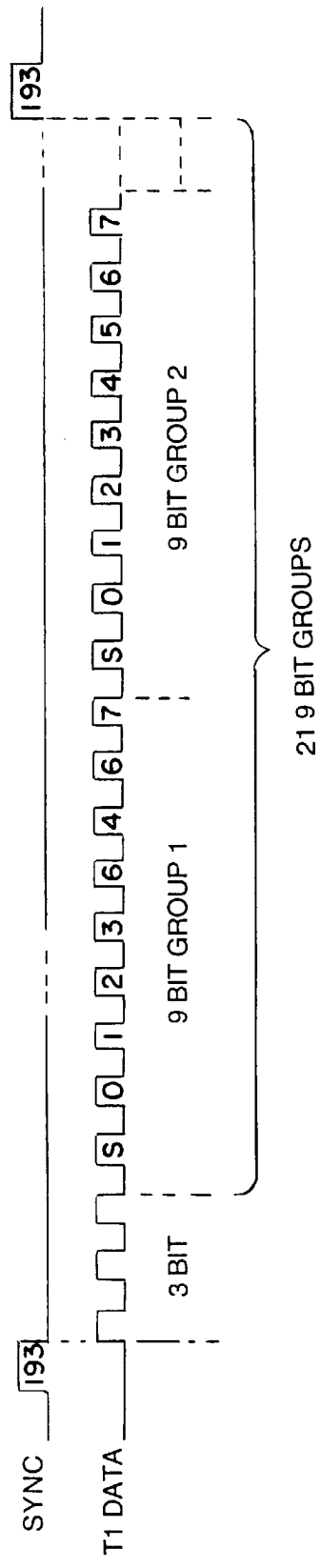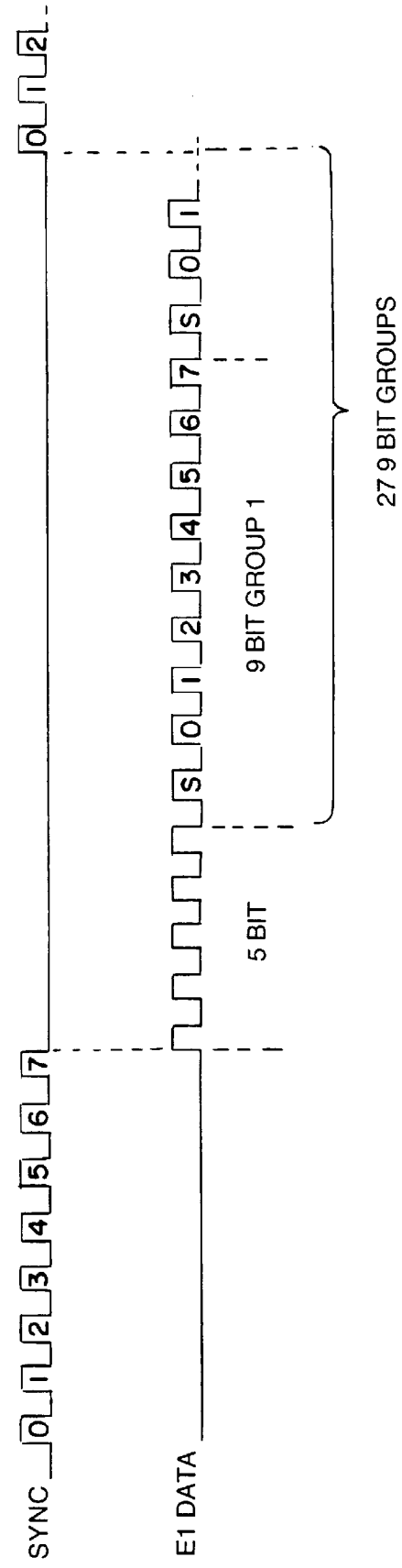

SECOND STAGE: RX_FIFO TO HDSL TRANSMISSION:

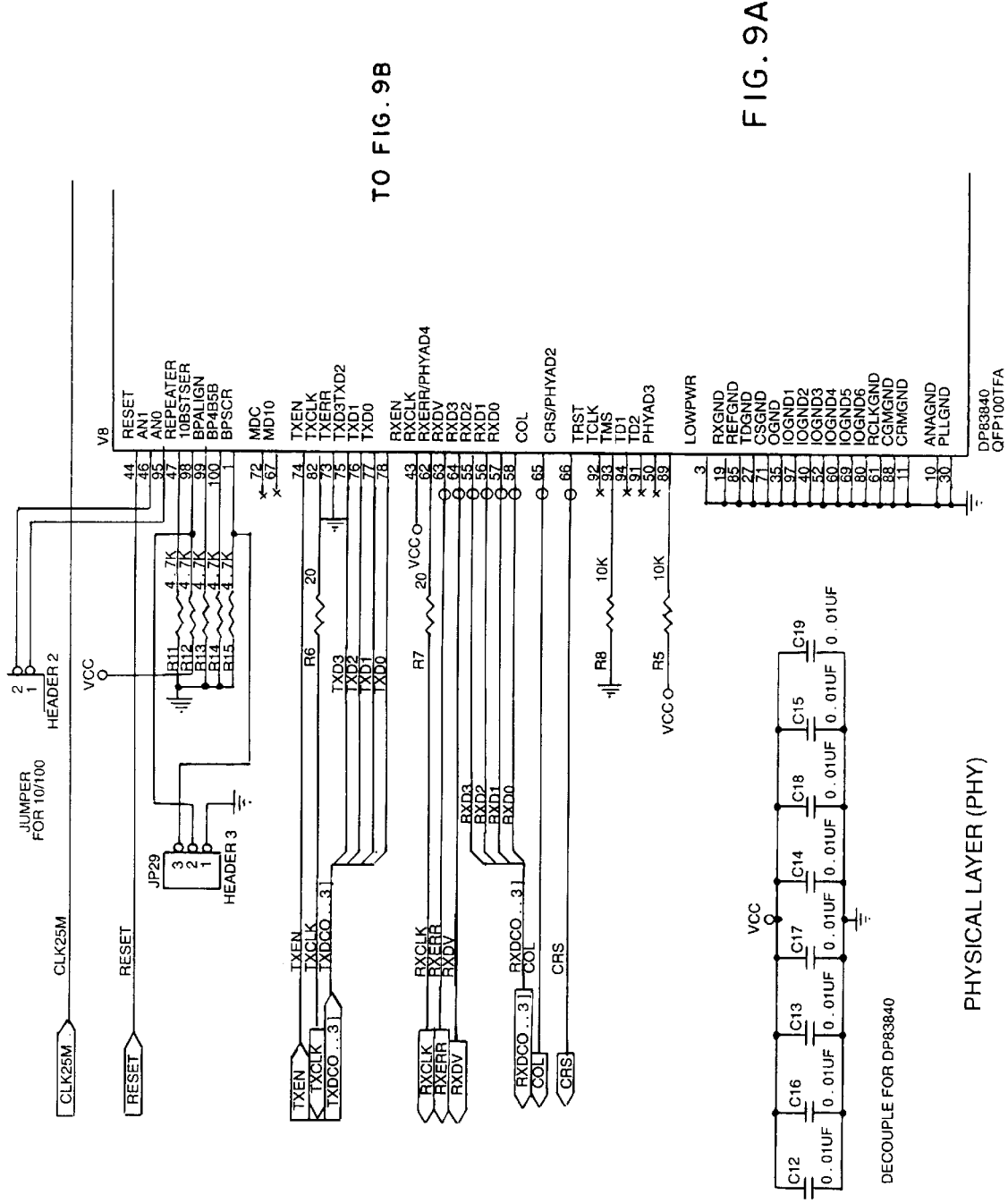

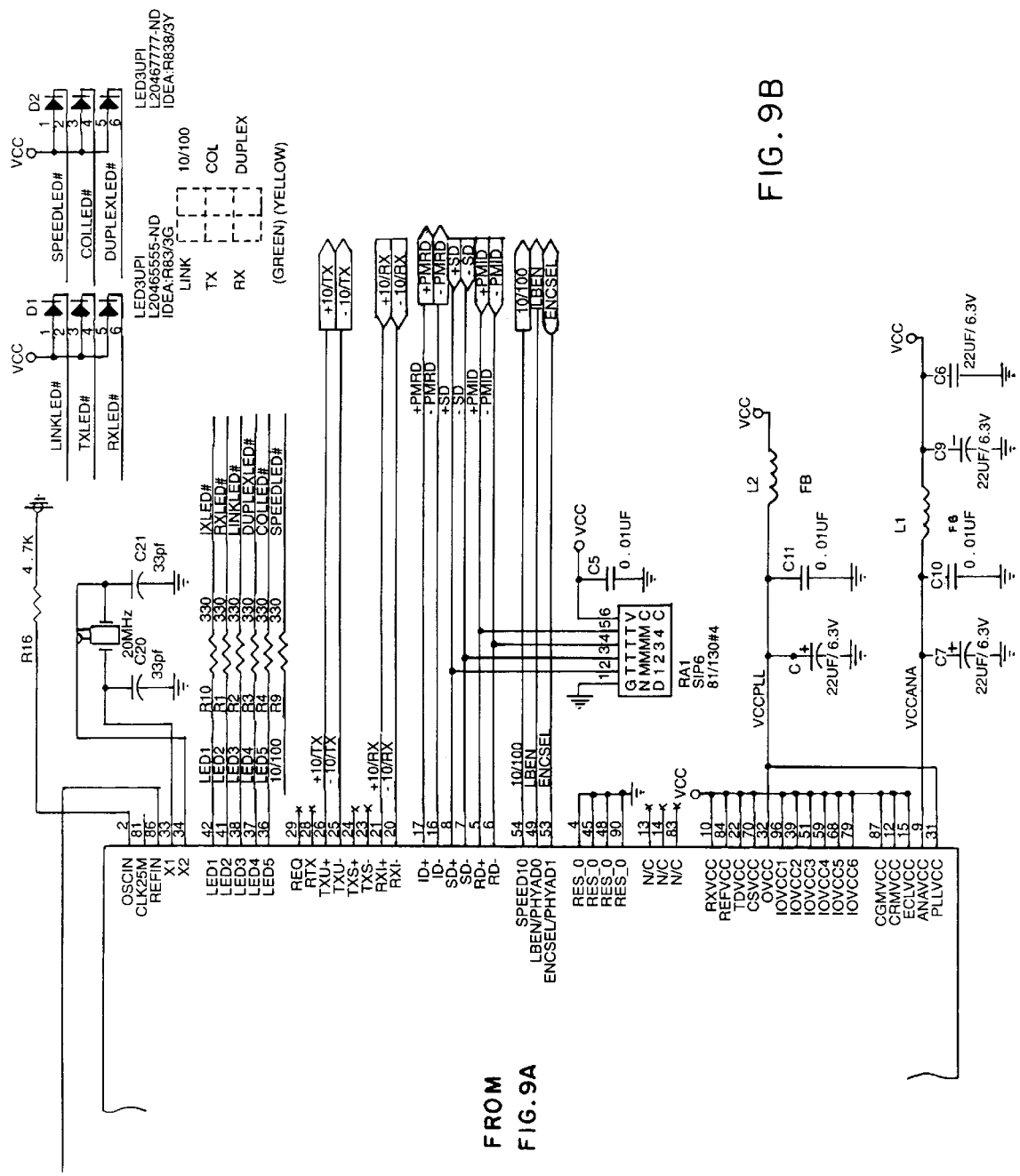

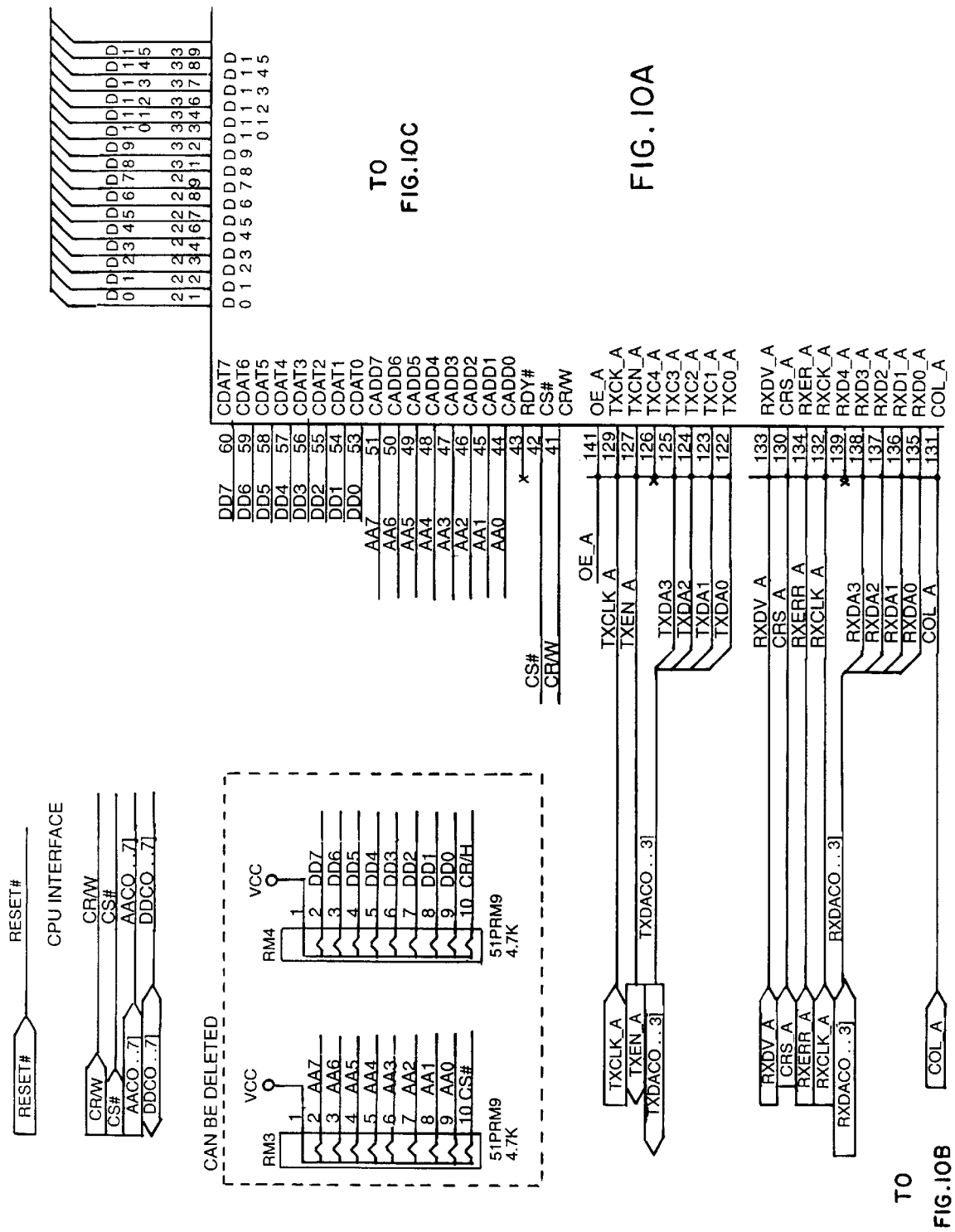

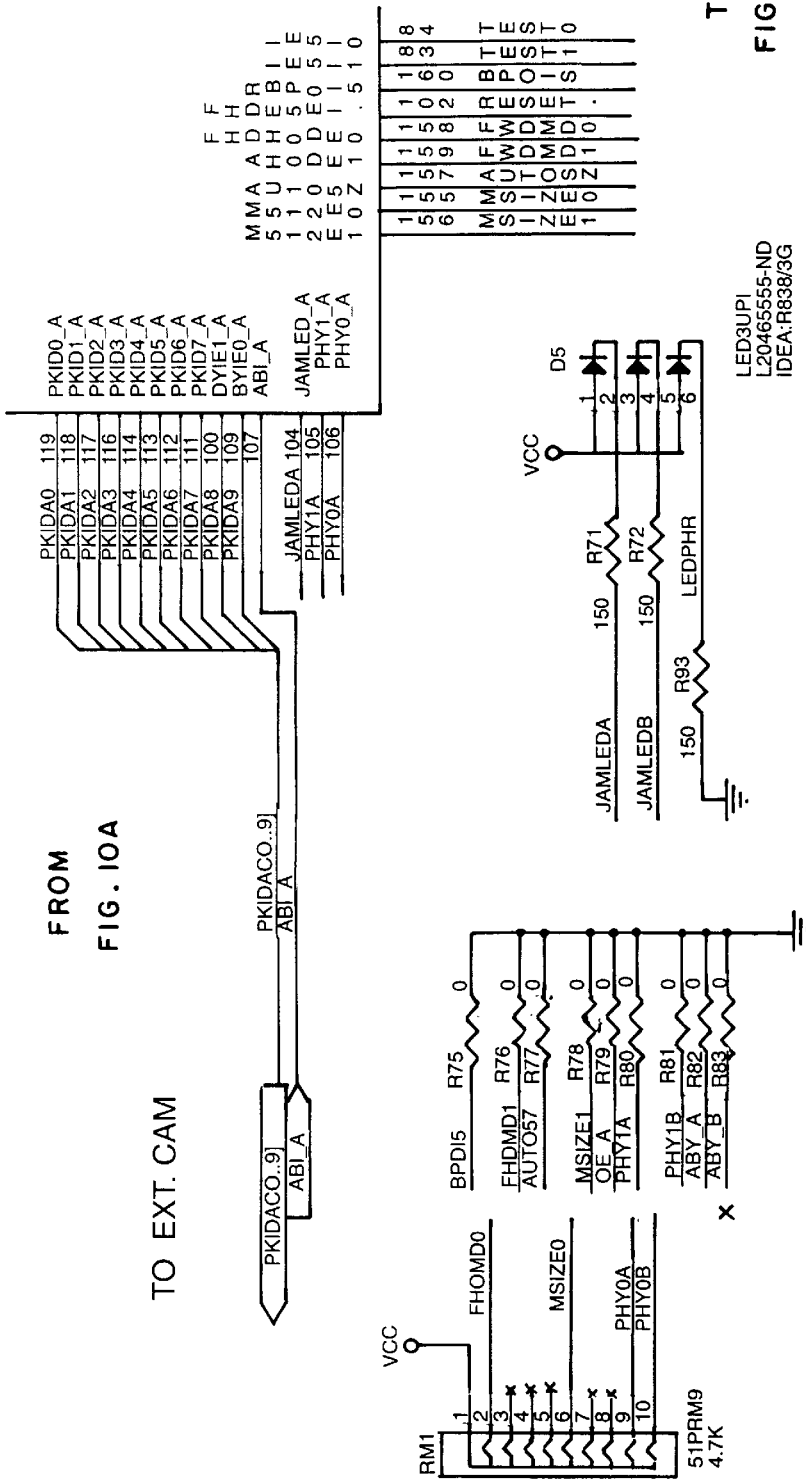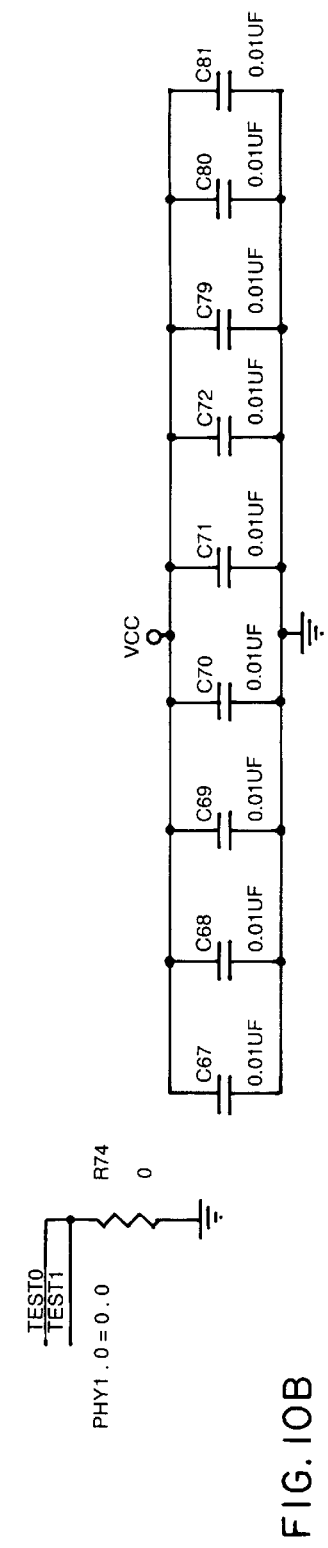
FIG. 10B

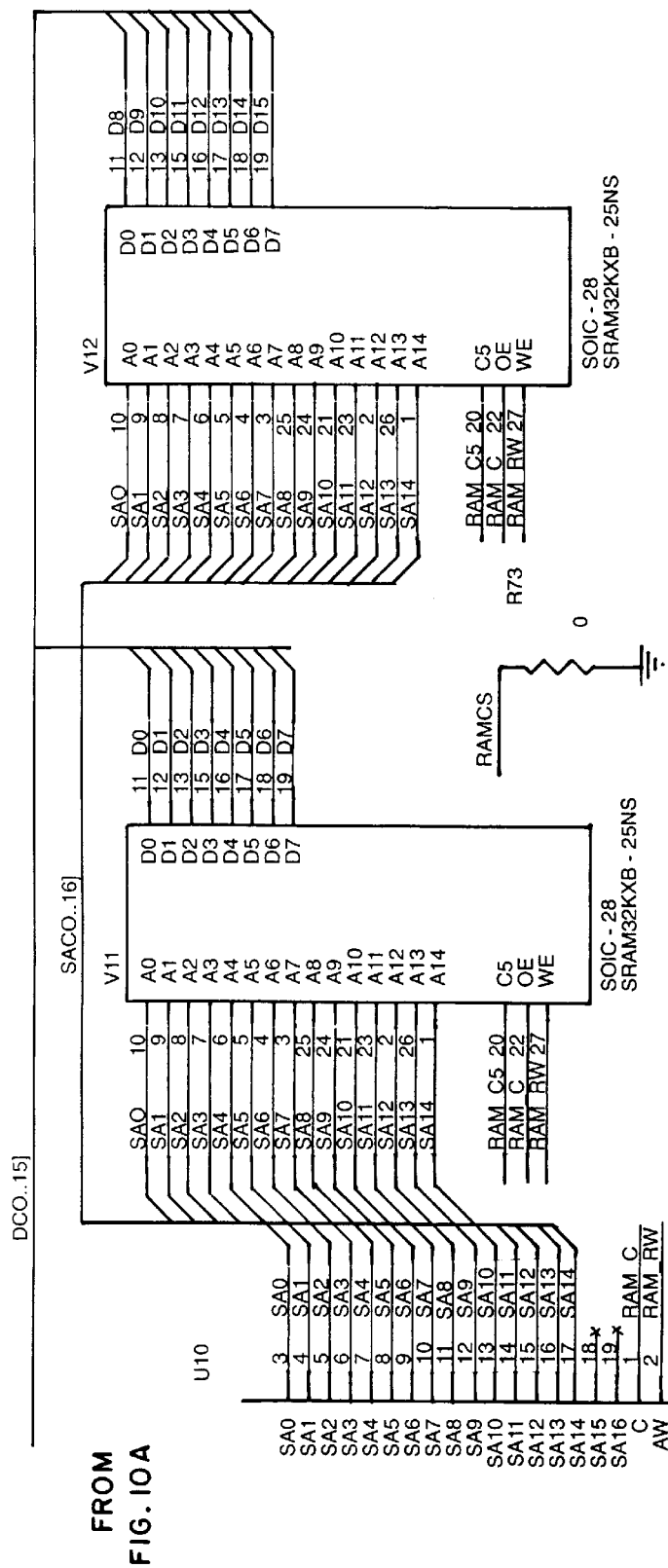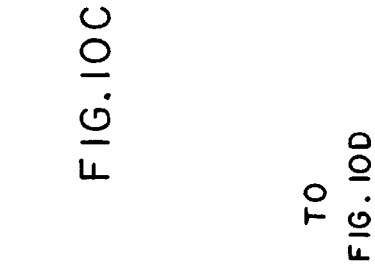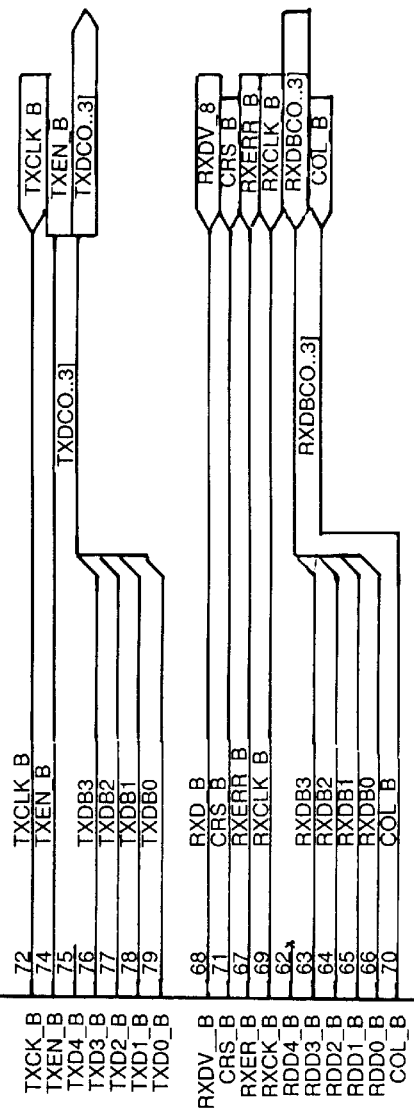

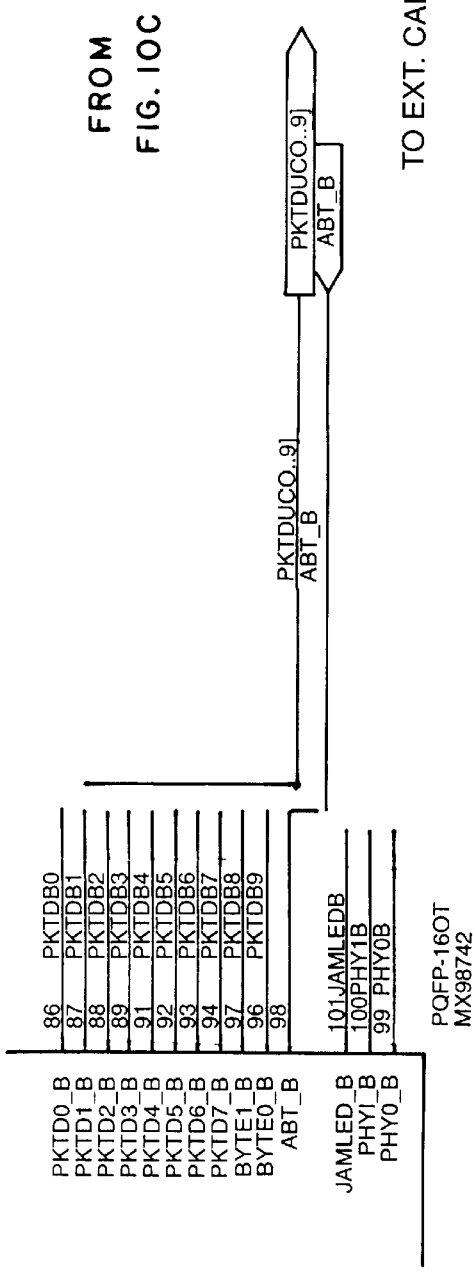
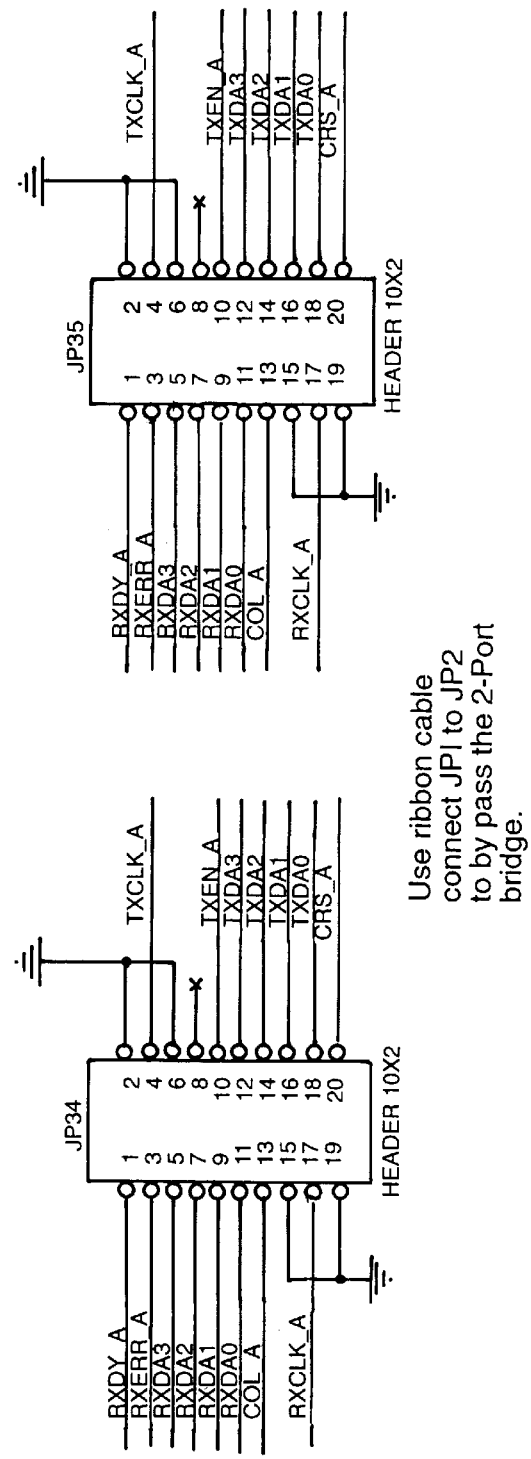
FIG. 10D
FIG. 10B

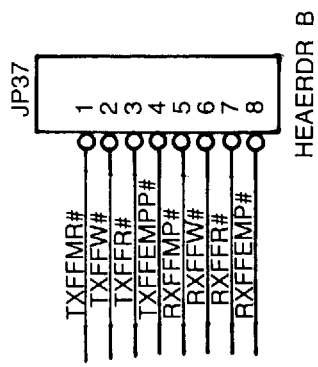
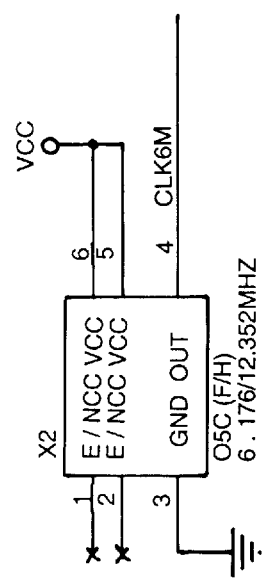
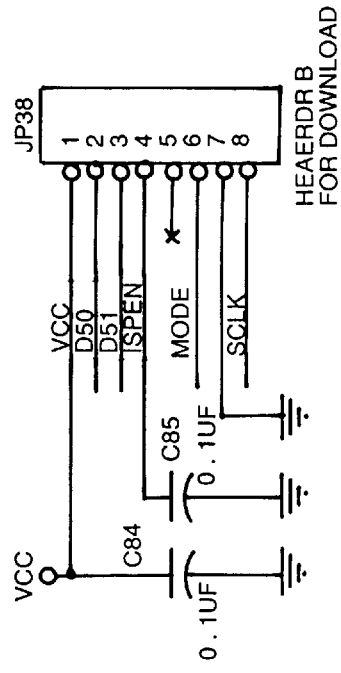
FIG. 11B
FROM FIG. 11A

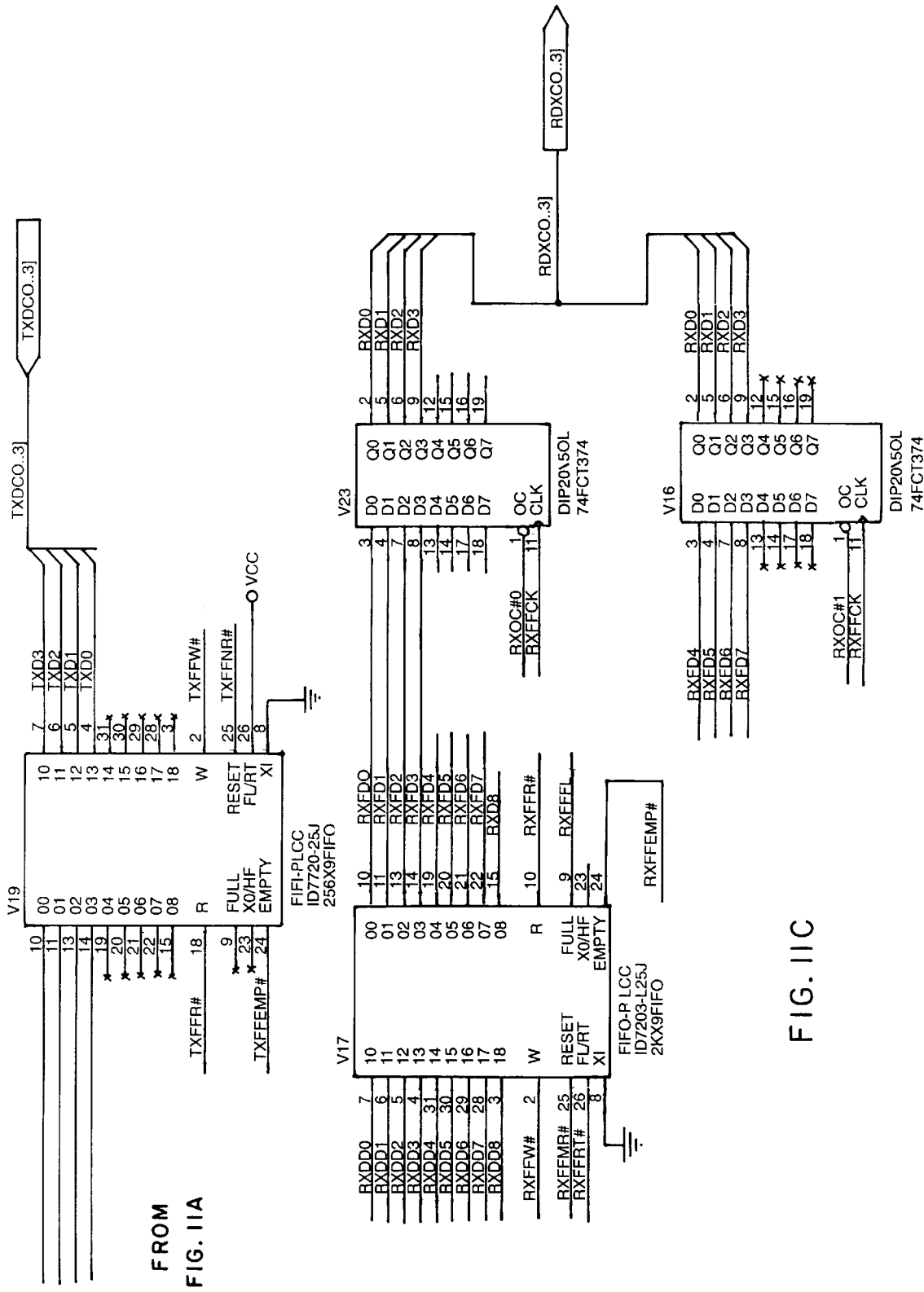
FIG. IIC

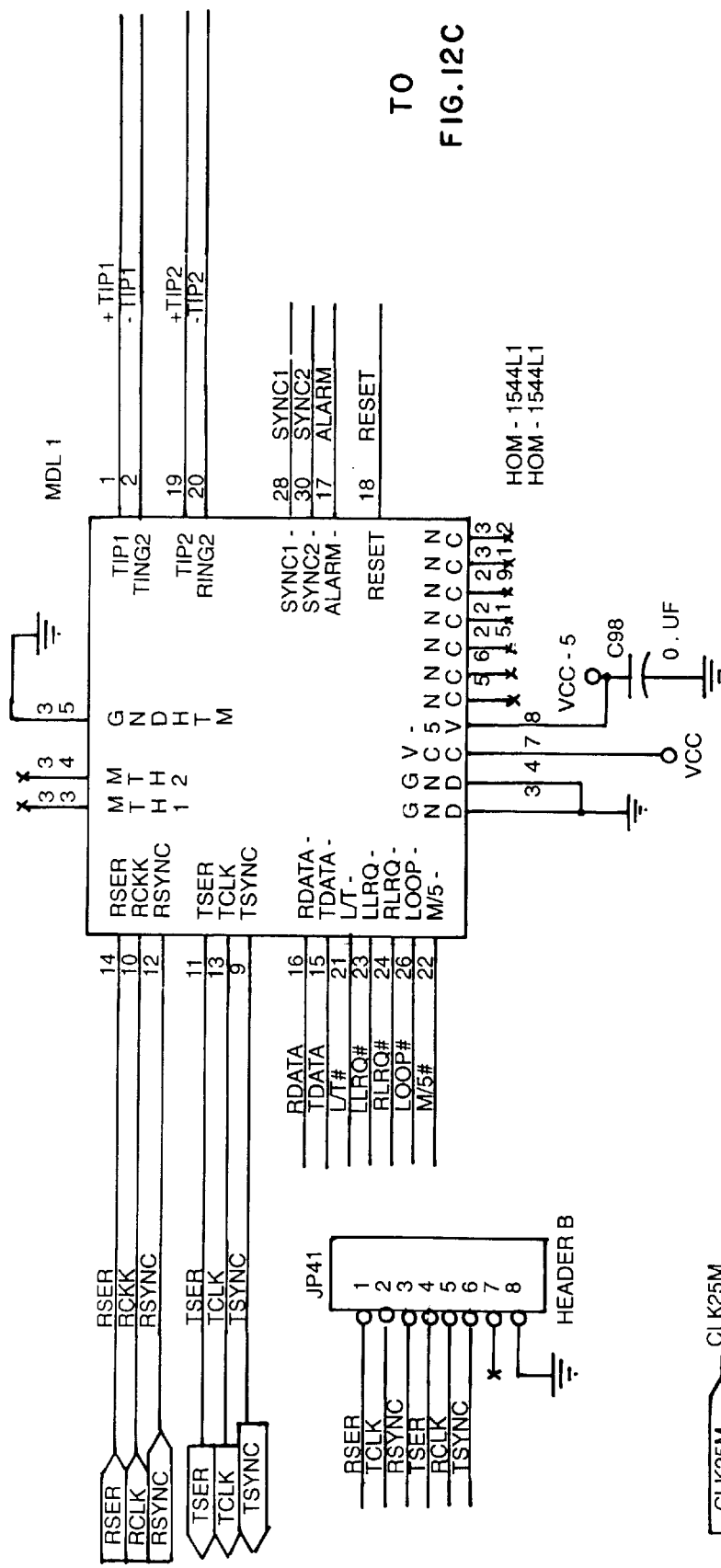

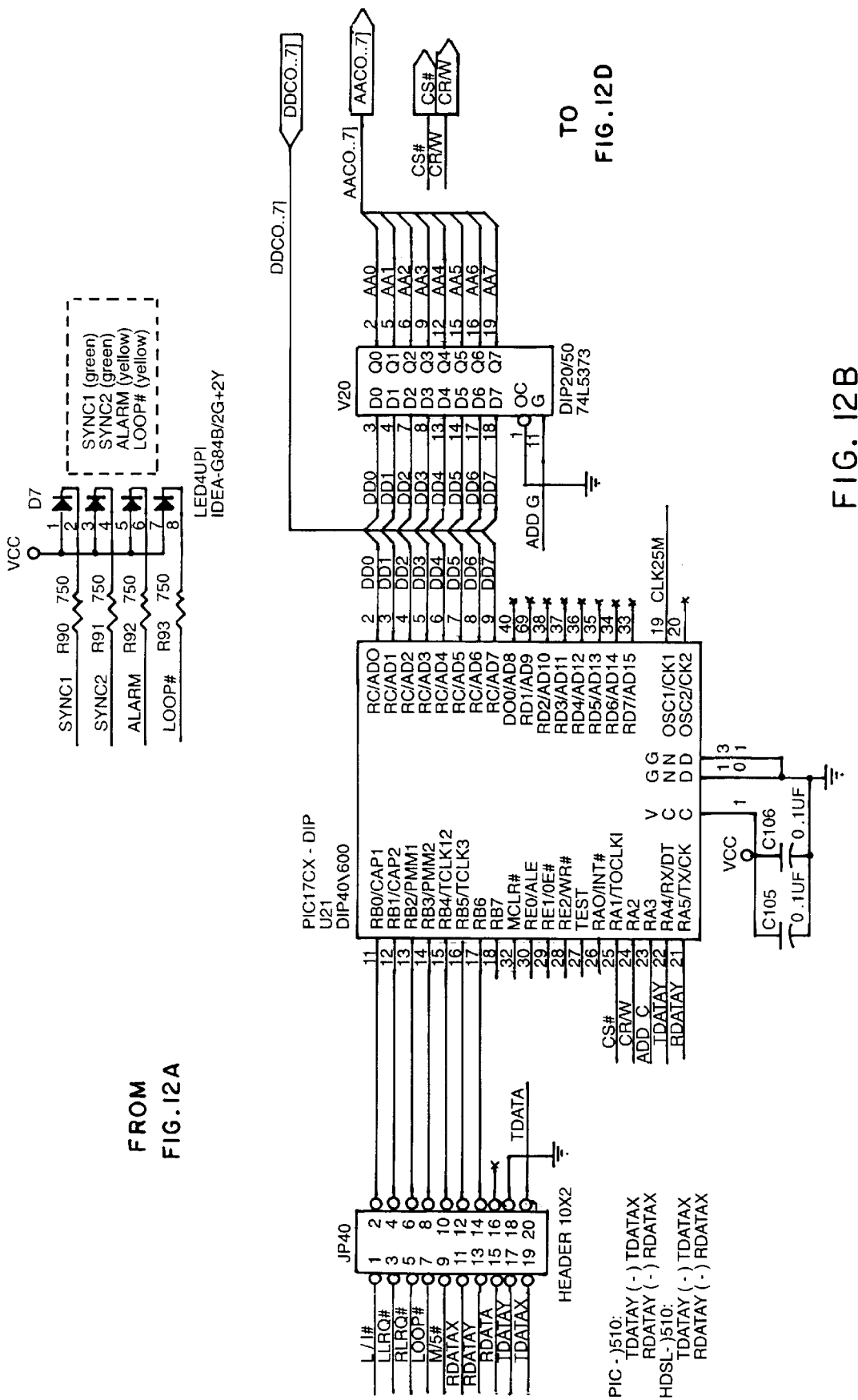

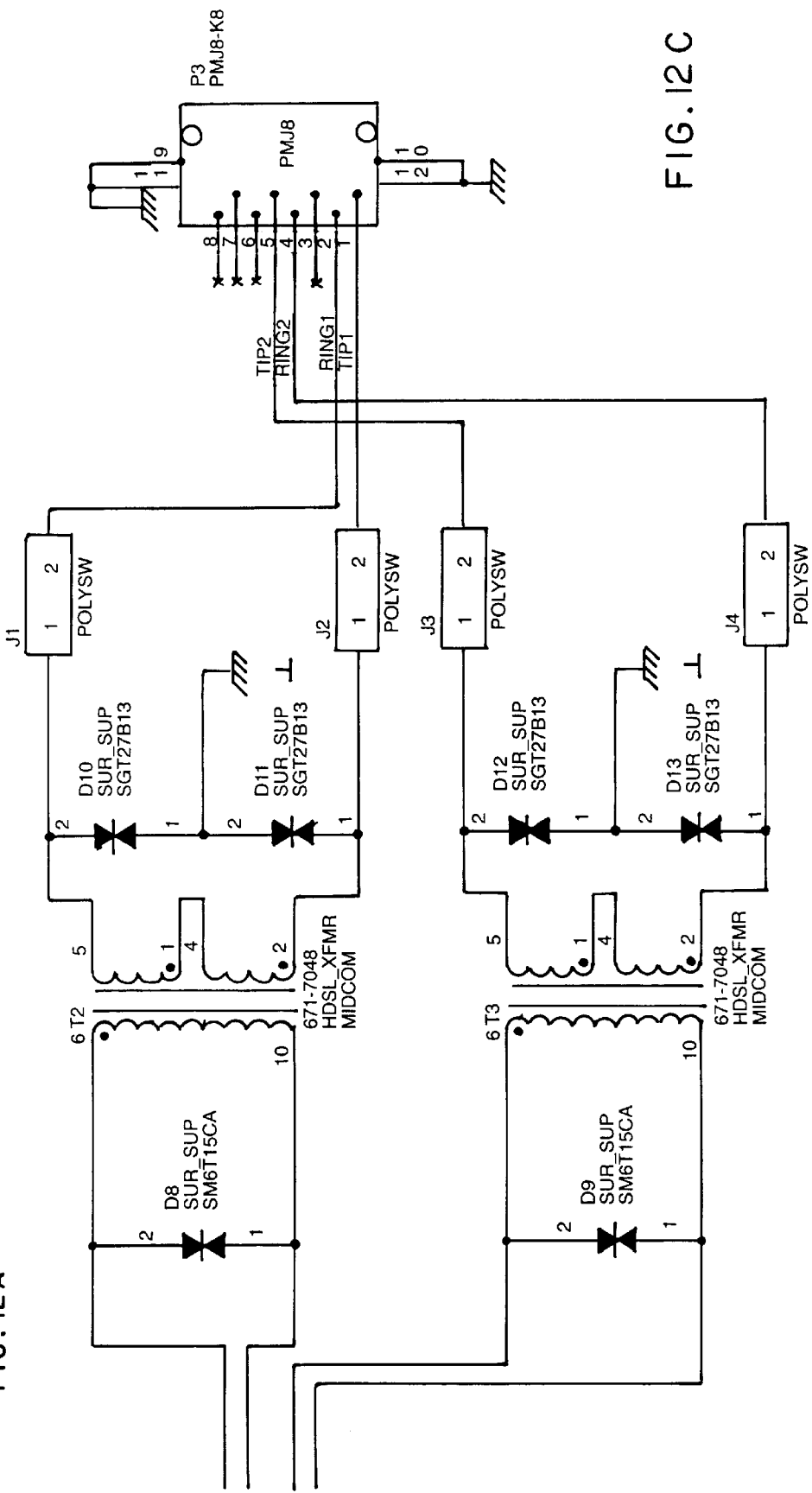

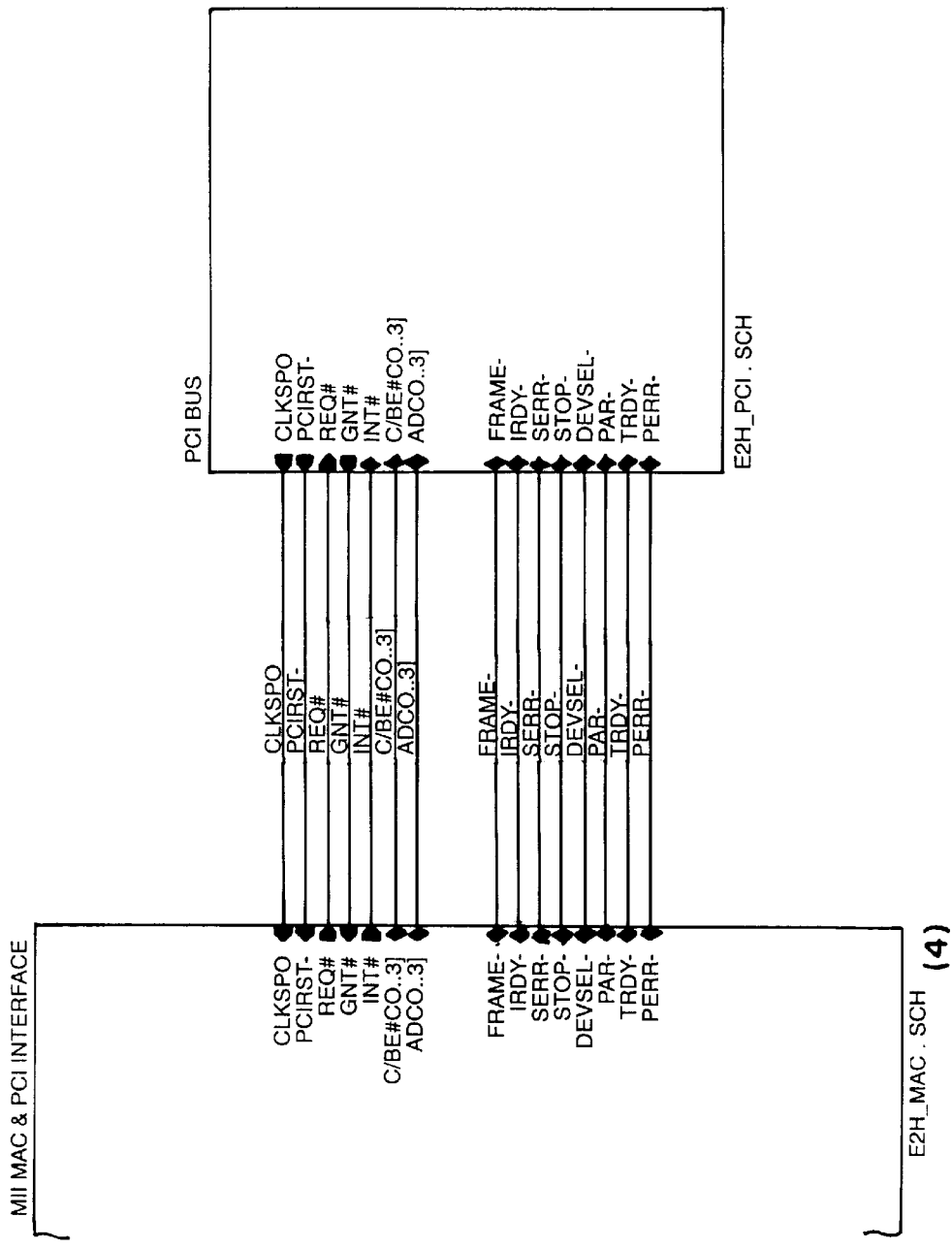

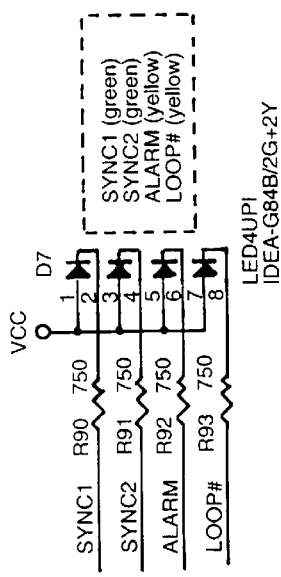
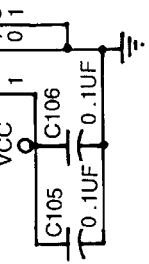
FIG. 14B

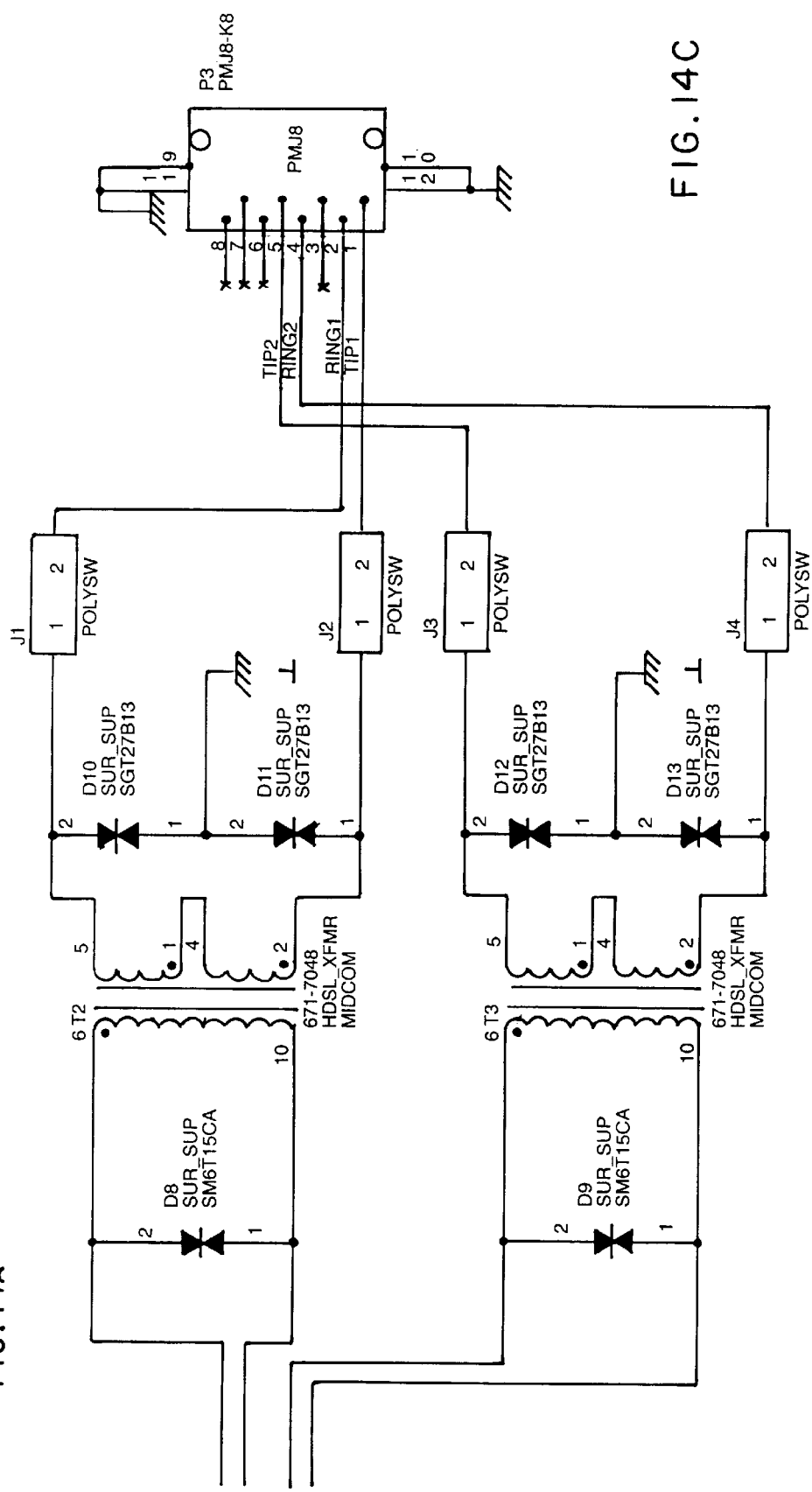

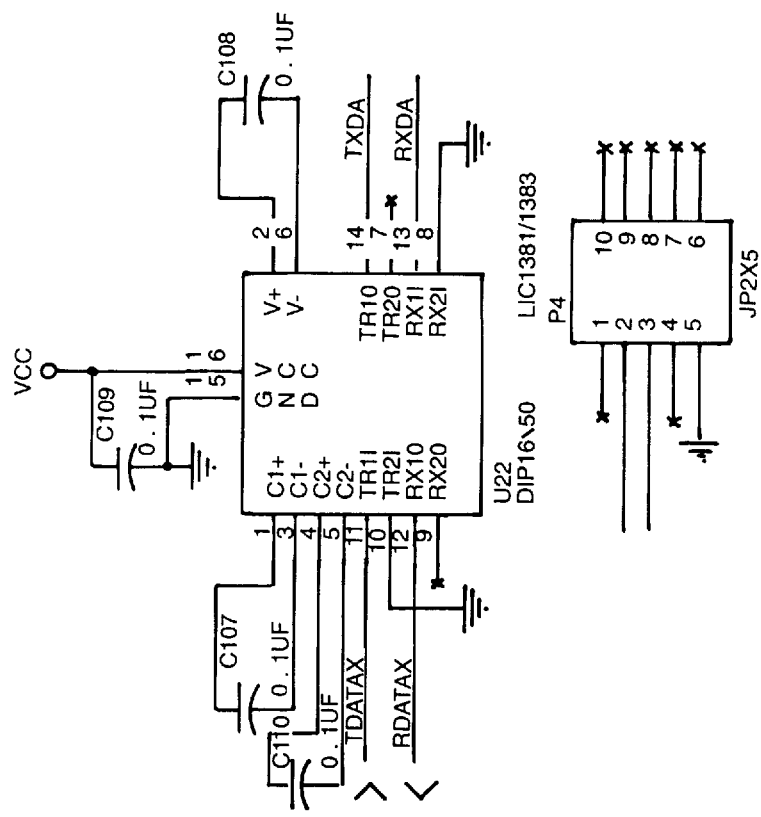

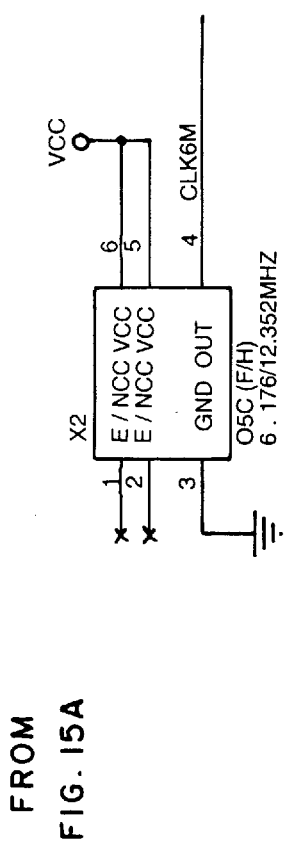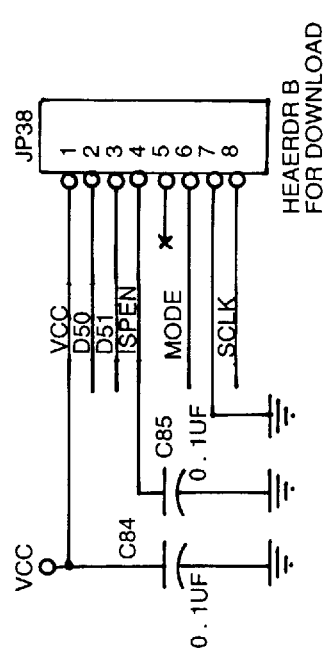
FIG. 15B

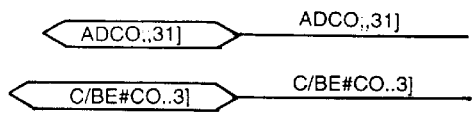
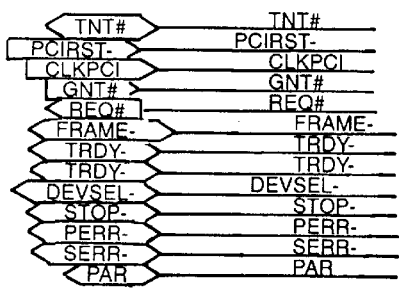
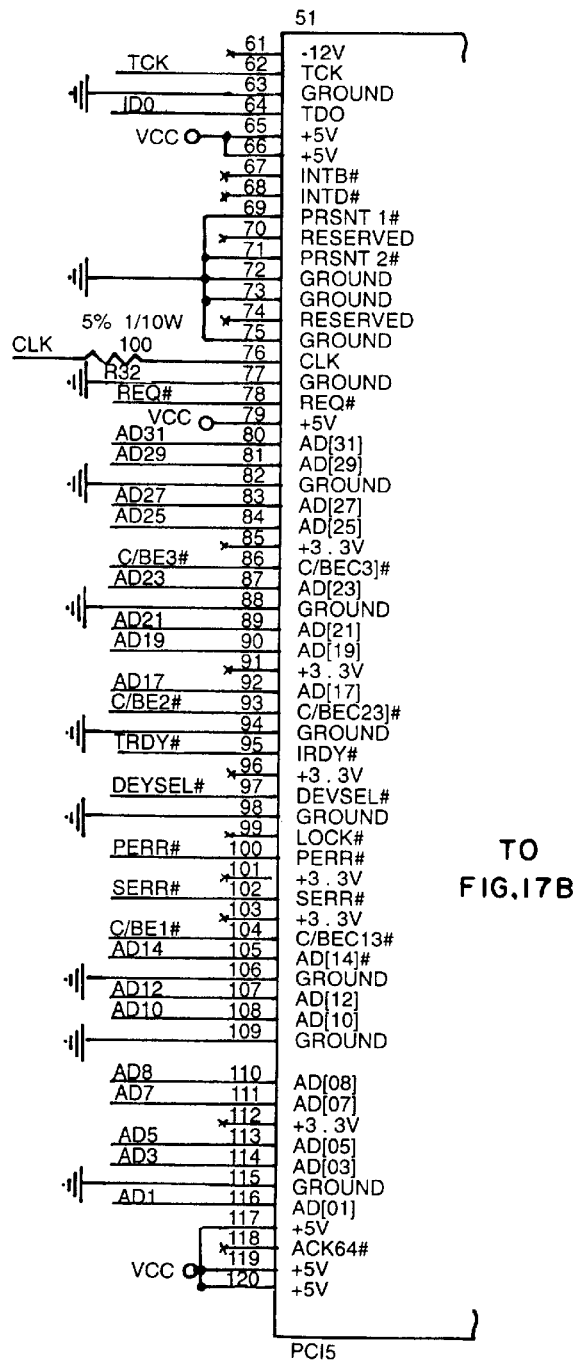
FIG. 17A

10/100-BASE ETHERNET TO T1/E1 HDSL CONVERTER AND METHOD OF OPERATION

FIELD OF THE INVENTION

This invention relates to the field of communications, and in particular a device for bridging Local Area Networks (LANs) implementing Ethernet network protocols with Wide Area Networks (WANs).

BACKGROUND

The Ethernet network is a well-known communication network and is considered by many as the most popular LAN system in use today. In general, the Ethernet network provides for communication of computer data amongst user nodes attached to the network. A 10-Base Ethernet system operates to transmit data packets from a source address to a destination address at a speed of 10 Mbit per second. A faster system is the 100-Base Ethernet system which similarly operates to transmit data packets from a source address to a destination address but at a speed of 100 Mbit per second. It should be noted, however, that the traditional Ethernet network is a bus type topology. As such, the Ethernet network has been traditionally confined to LAN applications. For example, the 10/100-Base Ethernet bus is typically limited to approximately 100 feet from node to node, such as for use in small buildings and the like.

In recent years there has been attempts to expand the capabilities of LANs in general to wide area network applications such as through the use of, Asynchronous Transfer Mode (ATM) system technology. However, adapting ATM for LAN use is considered complex and would involve significant software changes and complicated protocol management.

On the other hand, another generally known form of wide area network application technology is the T1/E1 High Speed Data Subscribe Line (HDSL) technology developed by AT&T. T1/E1 HDSL technology uses twisted pair transmission lines, much like that of the standard telephone line from the telephone company local central office to the subscriber, but can reach transmission speeds of up to 2 MHz.

In order to be able to interface between a 10/100-Base Ethernet system and a T1/E1 HDSL system, there have been recent attempts to develop bridging devices. Referring to FIG. 1, there is shown such a prior art bridging device which uses the known "store and forward technique".

When transmitting over the Ethernet a "frame" or "packet" is utilized. The packet is a series of bits forming a complete unit of information that is sent across a network. The typical packet has a 62 bit preamble, a 2 bit start of frame delimiter, 6 byte destination address, 6 byte source address, 64–1500 bytes data field, and 4 bytes cyclical redundancy code (CRC). There is typically a 96 bit gap between packets.

In FIG. 1 there is depicted in a simplified block diagram form is prior art bridge device 10 coupling one line Ethernet port 12 to T1/E1 HDSL line 14. Bridge device 10 includes CPU 16 coupled to main memory 18 over CPU/memory bus 20. Ethernet port 12 and memory to T1/E1 HDSL interface 22 are also coupled to CPU/memory bus 20. T1/E1 HDSL interface 24 interconnects between memory to T1/E1 HDSL interface 22 and T1/E1 HDSL line 14. Ethernet port 12 is coupled to a 10/100-Base Ethernet line 26 through respective physical layer (PHY) 28. PHY 28 translates the Ethernet wire signal to the TTL digital level in the well-known Ethernet protocol hierarchy and provides for clock recovery of the intermixed clock/data transmitted over Ethernet line 26. Ethernet port has Media Access Controller (MAC) 30, such as the Digital Equipment Corporation model DC21143, whose characteristics are set forth in the DECchip 21140A PCI Fast Ethernet LAN Controller Hardware Reference Manual dated October 1995 and is incorporated here by reference. MAC 30 processes the packets being transmitted/received by the port.

The typical Ethernet operates as follows. Using port 12 as a port receiving data from the Ethernet wire, PHY 28 filters out the clock to obtain the desired packet. MAC 30 would then receive the incoming packet and copy it to main memory 18 over bus 20 in accordance with the CPU/memory bus protocol. CPU 16 would read main memory 18. CPU 16 then initiates having the packet copied from main memory 18 to Memory to T1/E1 HDSL interface 22 which translates the packet into T1/E1 HDSL protocol frame format and sends the translated packet to T1/E1 HDSL interface 24 for transmission on T1/E1 HDSL line 14. A similar process occurs when T1/E1 HDSL line 14 has information to be received by Ethernet port 12 for transmission over Ethernet line 26.

This typical Ethernet bridge has latency problems. The store and forward approach under CPU control takes significant compute time to process the packet from Ethernet port 12, to main memory 18, and then to respective T1/E1 HDSL interfaces 22, 24 before a properly formatted frame is sent over T1/E1 HDSL line 14. Therefore, there is a still a need to be able to extend the Ethernet into wide area network applications using a simple to implement high performance device which maintains control over the data flow recognizing the speed difference between T1/E1 HDSL transmission (2 Mbit per second) and Ethernet transmission (10/100 Mbit per second). The embodiments of the present invention provide such a system.

SUMMARY OF THE INVENTION

In accordance with the present invention received Ethernet MII packets are converted to T1/E1 HDSL frames and received T1/E1 HDSL frames are converted into Ethernet MII packets. When Ethernet MII format 4 bit data packets are received they are converted into 8 bit data packets, each 8 bit data packet having an associated signal bit.

For T1, a series of twenty-one 8 bit data packets and associated signal bit are combined with three pass bits into a 192 bit T1 HDSL frame. The series of twenty-one multiple 8 bit packets and associated signal bit with three pass bits are transmitted in T1 HDSL format. When T1 HDSL frames having a series of twenty-one 9 bit packets, each 9 bit packet including 8 data bits with an associated signal bit, and three pass bits, are received, the series of twenty-one 9 bit packets and three pass bits are converted into twenty-one groups of 9 bit packets, each 9 bit packet including an 8 bit data packet with an associated signal bit. Each 8 bit data packet is converted into a 4 bit data MII packet and the 4 bit data MII packet is transmitted in Ethernet packet format.

For E1, a series of twenty-seven 8 bit data packets and associated signal bit are combined with five pass bits into a 256 bit E1 HDSL frame. The series of twenty-seven multiple 8 bit packets and associated signal bit with three pass bits are transmitted in E1 HDSL format. When E1 HDSL frames having a series of twenty-seven 9 bit packets, each 9 bit packet including 8 data bits with an associated signal bit, and five pass bits, are received, the series of twenty-seven 9 bit packets and five pass bits are converted into twenty-seven groups of 9 bit packets, each 9 bit packet including an 8 bit data packet with an associated signal bit. Each 8 bit data packet is converted into a 4 bit data MII packet and the 4 bit data MII packet is transmitted in Ethernet packet format.

BRIEF DESCRIPTION OF THE DRAWINGS

FIGS. 4a and 4b show the sync and data lines used in practicing the respective T1 and E1 embodiments of the present invention.

FIGS. 9a, 9b, 9c and 9d show specific pin connections of the Physical Layer (PHY);

FIGS. 10a, 10b, 10c and 10d show specific pin connections for the 2 Port MAC and Buffer Memory;

FIGS. 11a, 11b, 11c show specific pin connections for the MTI to HDSL Interface;

FIGS. 12a, 12b, 12c and 12d show specific pin connections for the HDSL Interface;

FIGS. 13a and 13b show specific pin connections for the ET-3101: Ethernet to HDSL Bridge;

FIGS. 14a, 14b, 14c and 14d show specific pin connections for the HDSL OEM Module;

FIGS. 15a, 15b and 15c show specific pin connections for the 64×4 Fifo;

FIGS. 17a and 17b show specific pin connections for the PCI Bus.

Appendix A shows the T1 and E1 framing used in accordance with the present invention.

Figure 5A:
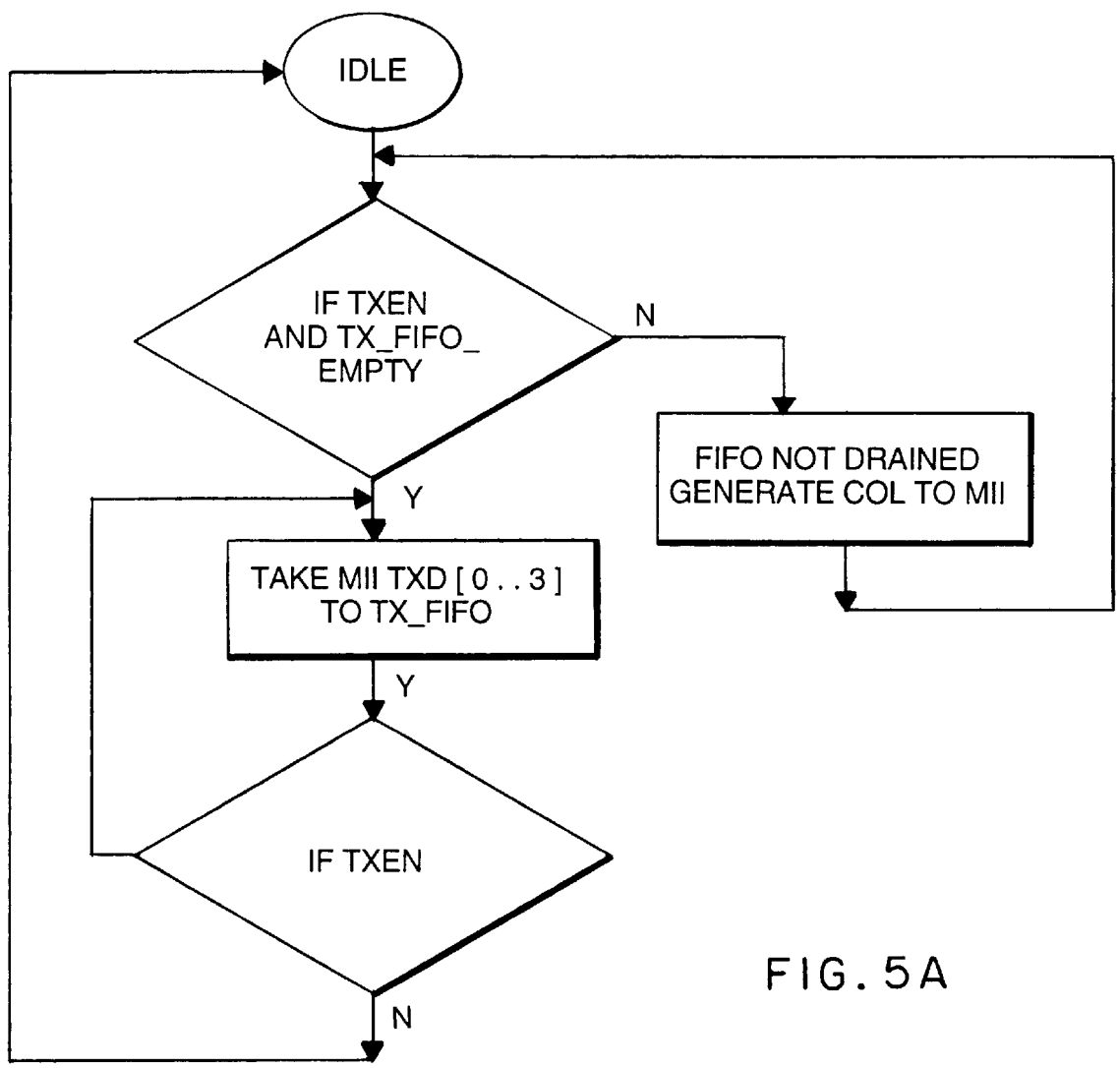
FIGS. 5a and 5b depict in flow chart form two stages of data transmission from Ethernet MII to T1/E1 HDSL.
Figure 5B:
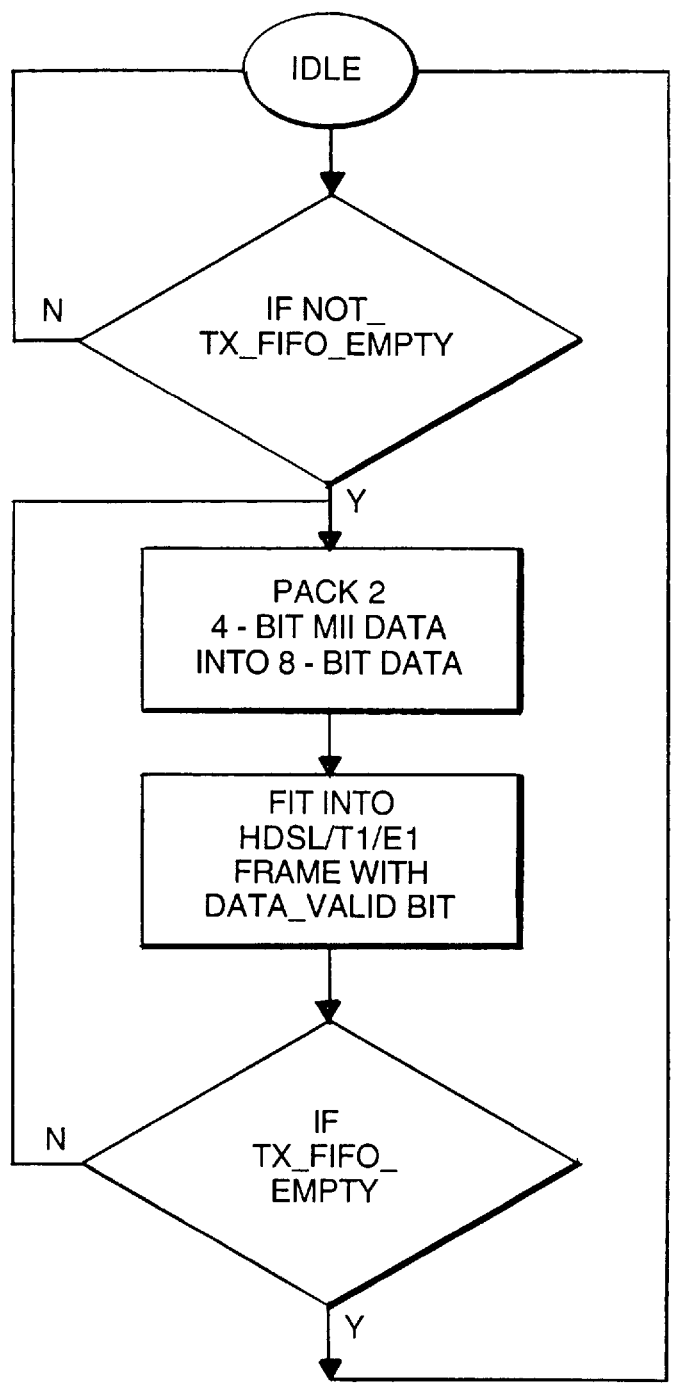

Appendix B(1) explains the specific operations depicted in the FIGS. 5a and 5b flowcharts.

Figure 6A:
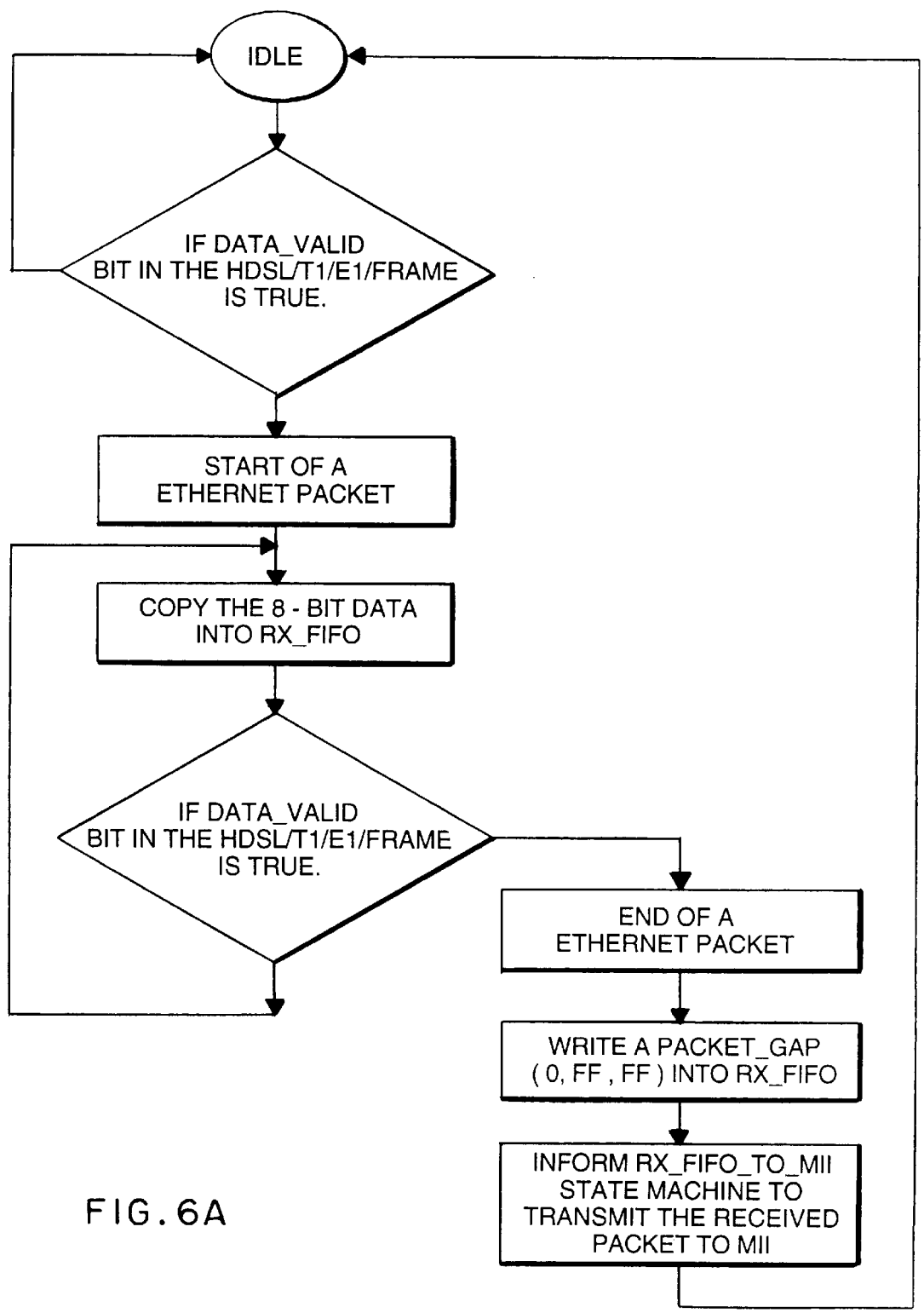
FIGS. 6a and 6b depict two stages of data transmission from T1/E1 HDSL to Ethernet MII.
Figure 6B:
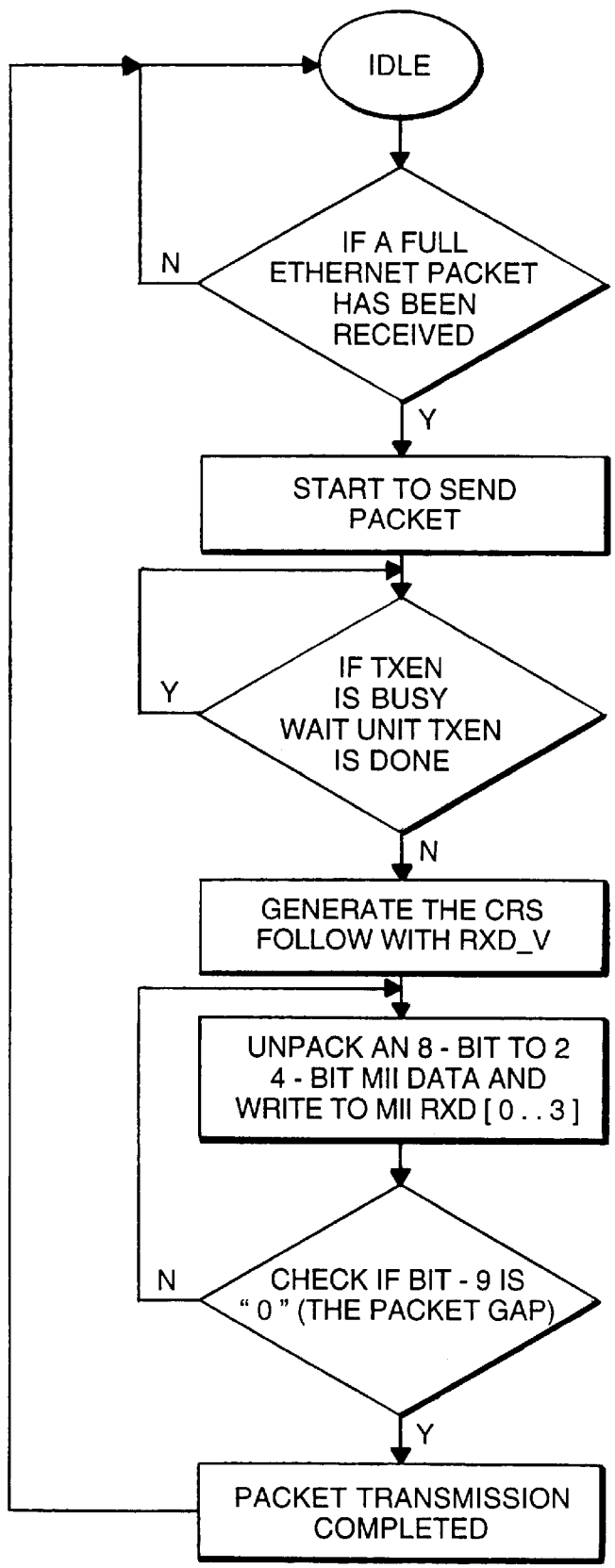

Appendix B(2) explains the specific operations depicted in the FIGS. 6a and 6b flowcharts.

DETAILED DESCRIPTION

Figure 2:
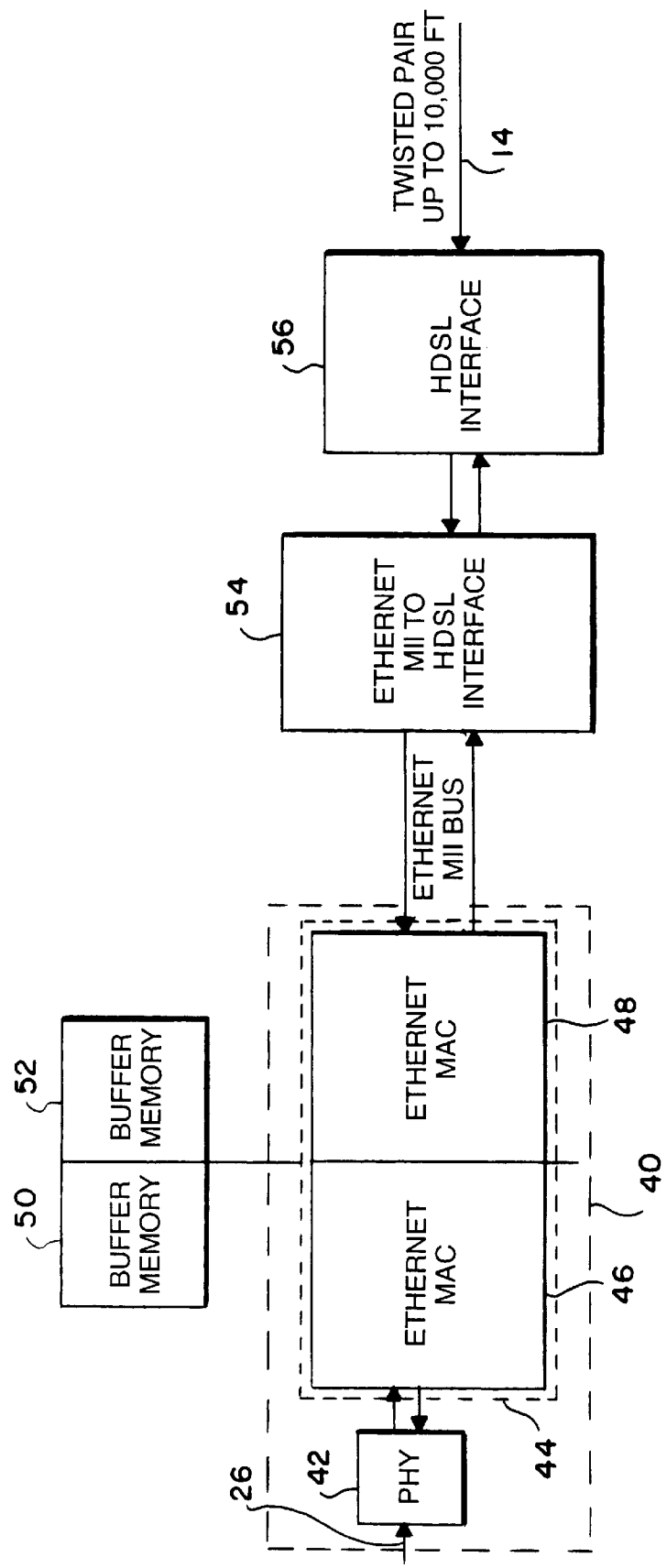
FIG. 2 shows in block diagram form a preferred embodiment of the present invention.

Referring to FIG. 2, there is shown in simplified block diagram form an embodiment of the present invention.

Figure 1:
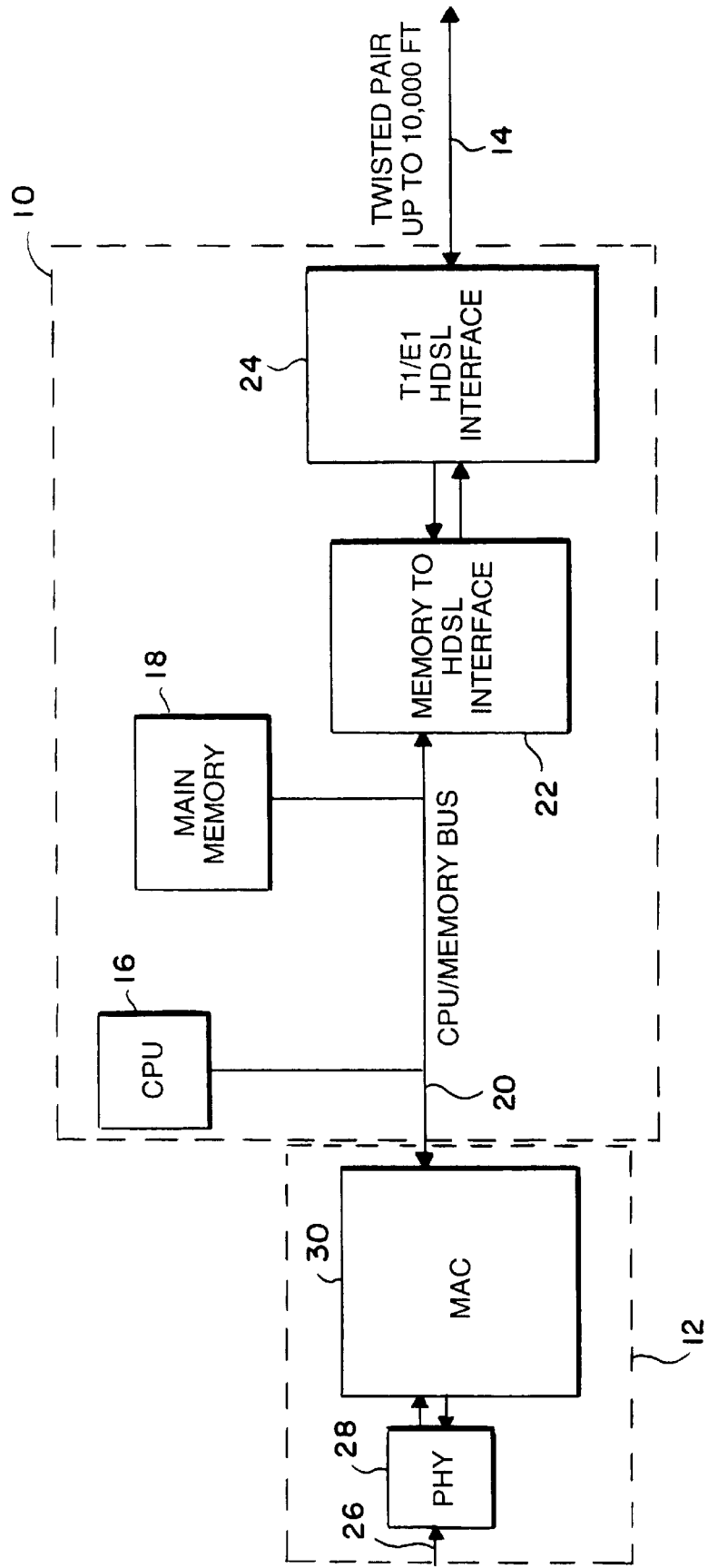
FIG. 1 shows in block diagram form a typical prior art Ethernet to T1/E1 HDSL bridge.

As in the prior art system, Ethernet port 40 has a PHY 42 coupled to Ethernet line 26. PHY 42 operates as described above with regard to port 12 of the prior art bridge device shown in FIG. 1. In the preferred embodiment of the present invention Ethernet port 40 would include MAC 44, which in the preferred embodiment includes dual MACs 46, 48. Coupled respectively to MAC 46, 48 are dual buffer memories 50, 52. The dual MAC and dual buffer memories can be implemented using the model MX9742 MAC bridge controller manufactured by Macronix. In the preferred embodiment MAC 46 and buffer memory 50 are used to receive, store and process Ethernet packets being sent to the T1/E1 HDSL, while MAC 48 and buffer memory 52 is used to receive store and process T1/E1 HDSL frames being sent to the Ethernet. The buffer memories are included to provide storage necessary for flow control managed by the MACs due to the Ethernet/T1/E1 HDSL speed differential. In the preferred embodiment MACs 46 and 48 operate in "cut through" mode which helps improve the overall bridge device latency by eliminating the need to receive an entire packet before forwarding as in the "store and forward" mode.

MAC 46, in operation, will take the Ethernet packet data stored in buffer memory 50 and transmit in Media Independent Interface (MII) format the data to Ethernet MII to T1/E1 HDSL interface 54 coupled thereto. The Ethernet MII characteristics and functionality is specified in the ANSI / IEEE Std 802.3u, which is incorporated herein by reference.

T1/E1 HDSL interface 56 which is coupled to Ethernet MII to T1/E1 HDSL interface 54, couples the digital signals output from Ethernet MII to T1/E1 HDSL interface 54 to T1/E1 HDSL twisted pair line 14. T1/E1 HDSL interface 56 can be implemented using Pair Gain model HOM-1544L1 modules.

Figure 3:
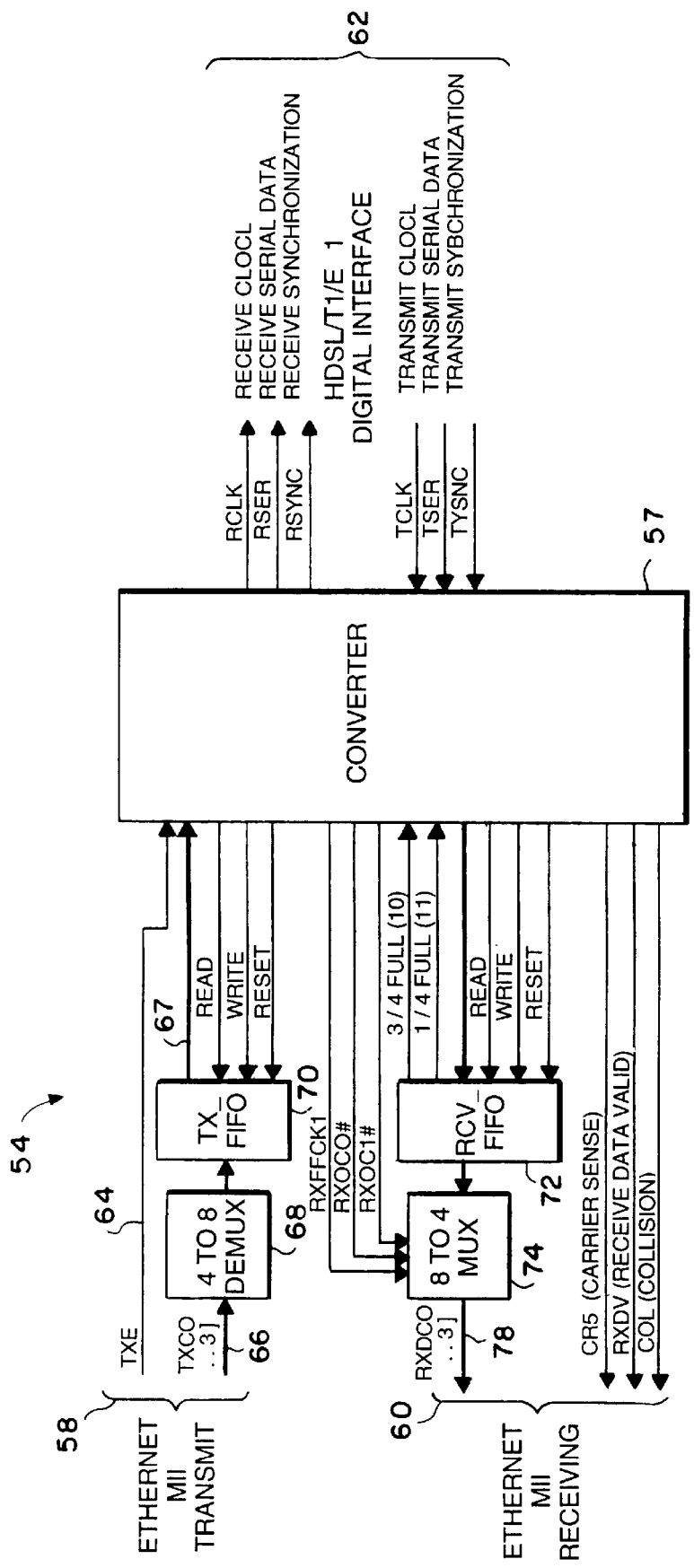
FIG. 3 shows in block diagram form an Ethernet MII to T1/E1 HDSL interface.

Referring to FIG. 3. there is shown in block diagram form Ethernet MII to T1/E1 HDSL interface 54. Ethernet MII to T1/E1 HDSL interface 54 includes converter 57 to which is coupled Ethernet MII transmit signal lines 58, Ethernet MII receive signal lines 60 and digital interface lines 62. Converter 57 is a field programmable gate array, such as the Lattice Semiconductor Corporation model ispLSI1032 high density programmable logic device, whose output signals and pin assignments are specified in the 1996 Lattice Semiconductor Data Book, which is incorporated herein by reference.

To understand the flow of data from the Ethernet side to the T1/E1 HDSL side of the converter, consider first the T1/E1 HDSL bit formatting. HDSL, in T1 format, runs at 1.544 MHz and in Europe in E1 format, runs at 2.048 MHz. For T1, a frame sync pulse, e.g., bit 193, is used to allow a receiving device to know where the start of data occurs to recover 192 bits of data between frame sync pulses. Since Ethernet only transmits 8 bits, the present invention uses a 9 bit implementation, namely 8 bits of data and 1 signal bit. Therefore, to accommodate the 192 bit stream, after the frame sync pulse occurs, 3 bits pass and then twenty-one 9 bit groups (i.e., a signal bit and 8 bits of data) are utilized. For E1, 8 bit frame sync pulses are used to allow a receiving device to know where the start of data occurs to recover 256 bits of data between frame sync pulses. Since Ethernet only transmits 8 bits, the present invention uses a 9 bit implementation, namely 8 bits of data and 1 signal bit. Therefore, to accommodate the 256 bit stream after the frame sync pulses occur, 5 bits pass and then twenty-seven 9 bit groups (i.e., a signal bit and 8 bits of data) are utilized.

Referring to FIGS. 4a and 4b, a depiction of the sync and data lines is shown for T1 and E1 respectively. As can be seen in FIG. 4a, within the 192 bits between frame sync pulses, twenty-one nine bit groupings plus 3 delay bits can be accommodated. The signal bit s for each 9 bit group will be utilized for transmit enable. As can be seen in FIG. 4b, within the 192 bits between frame sync pulses, twenty-seven nine bit groupings plus 5 delay bits can be accommodated. The signal bit s for each 9 bit group will be utilized for transmit enable.

Referring back to FIG. 3, on the Ethernet MII transmit side, if there is data being transmitted to the T1/E1 HDSL line, a transmit enable TXE signal 64 is provided to converter 57 from MAC 46. 4 bit transmit data is sent along line 66 running at 25 Mbit/sec to 4 to 8 bit demultiplexer 68, which, in turn, provides 8 bits to transmit FIFO 70. TXE signal (i.e., a 1 indicating valid transmission coming, a 0 indicating no valid transmission coming), and the remaining 8 data bits 0–7 will be utilized for transmission on line 67. Converter 57, converts the transmit data to T1/E1 HDSL digital format ( i.e., providing after the frame sync pulse occurs, 3 bits to be passed and then twenty-one 9 bit groups comprising, a signal bit and 8 bits of data) in accordance with the T1 framing, or 5 bits to be passed and then twenty-seven 9 bit groups comprising, a signal bit and 8 bits of data) in accordance with the E1 framing (as set forth in more detail in Appendix A).

Similarly, on the Ethernet receive side, if there is data being transmitted from the T1/E1 HDSL line, a stream of data and signal bits are provided to converter 57 from T1/E1 HDSL lines 62 (i.e., for T1 192 bits between frame sync pulses, for E1 256 bits between frame and sync pulses), which, in turn, as provided for in the programming of converter 57, submits in Ethernet MII format signals and data to receive FIFO 72 (i.e, for T1—twenty-one 9 bit groups comprising, a signal bit and 8 bits of data, for E1—twenty-seven 9 bit groups comprising, a signal bit and 8 bits of data). FIFO 72 then provides data to 8 to 4 multiplexer 74, which in turn provides 4 MII bits to Ethernet line 78.

To further aid in the understanding of the data transmission from Ethernet MII to T1/E1 HDSL FIGS. 5a and 5b depict two stages of data transmission. FIG. 5a depicts in flow chart form the transmission steps during stage 1, namely steps from Ethernet MII to Transmission FIFO. FIG. 5b depicts in flow chart form the steps during stage 2, namely from Transmission FIFO to T1/E1 HDSL. Appendix B(1) explains the specific operations depicted in the FIGS. 5a and 5b flowcharts.

To further aid in the understanding of the data transmission from T1/E1 HDSL to Ethernet MII FIGS. 6a and 6b depict two stages of data transmission. FIG. 6a depicts in flow chart form the transmission steps during stage 1, namely steps from T1/E1 HDSL to Receive FIFO. FIG. 6b depicts in flow chart form the steps during stage 2, namely from Receive FIFO to Ethernet MII. Appendix B(2) explains the specific operations depicted in the FIGS. 6a and 6b flowcharts.

Figure 7:
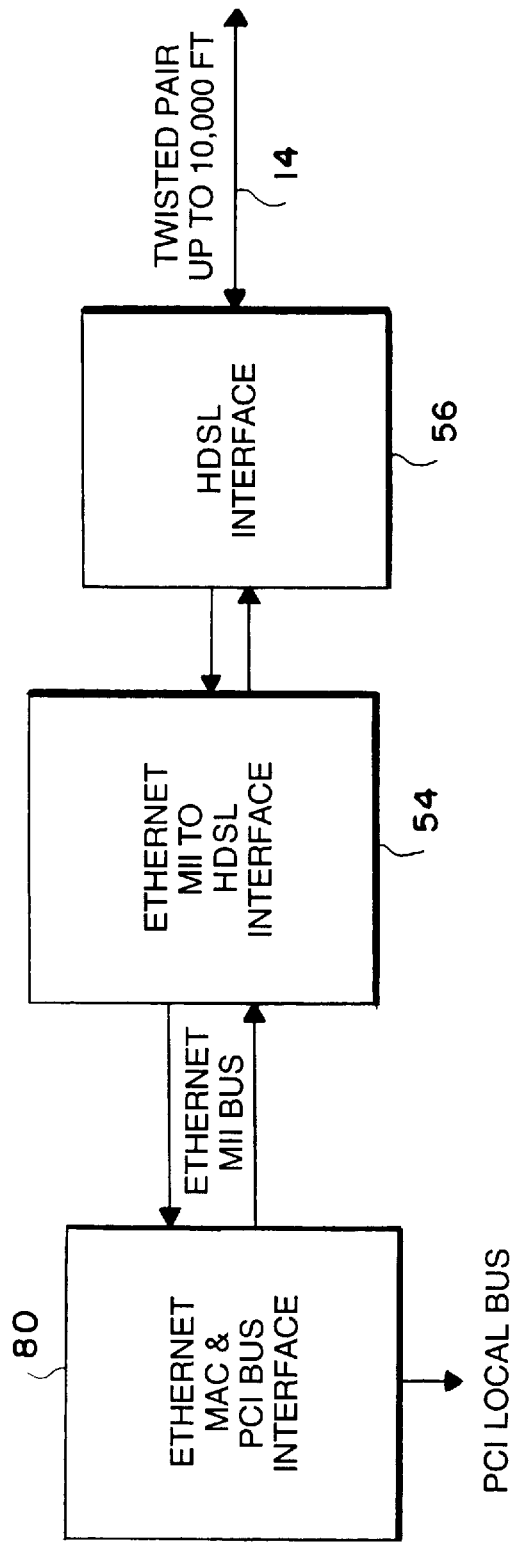
FIG. 7 shows in block diagram form another preferred embodiment of the present invention.
Figure 8A:
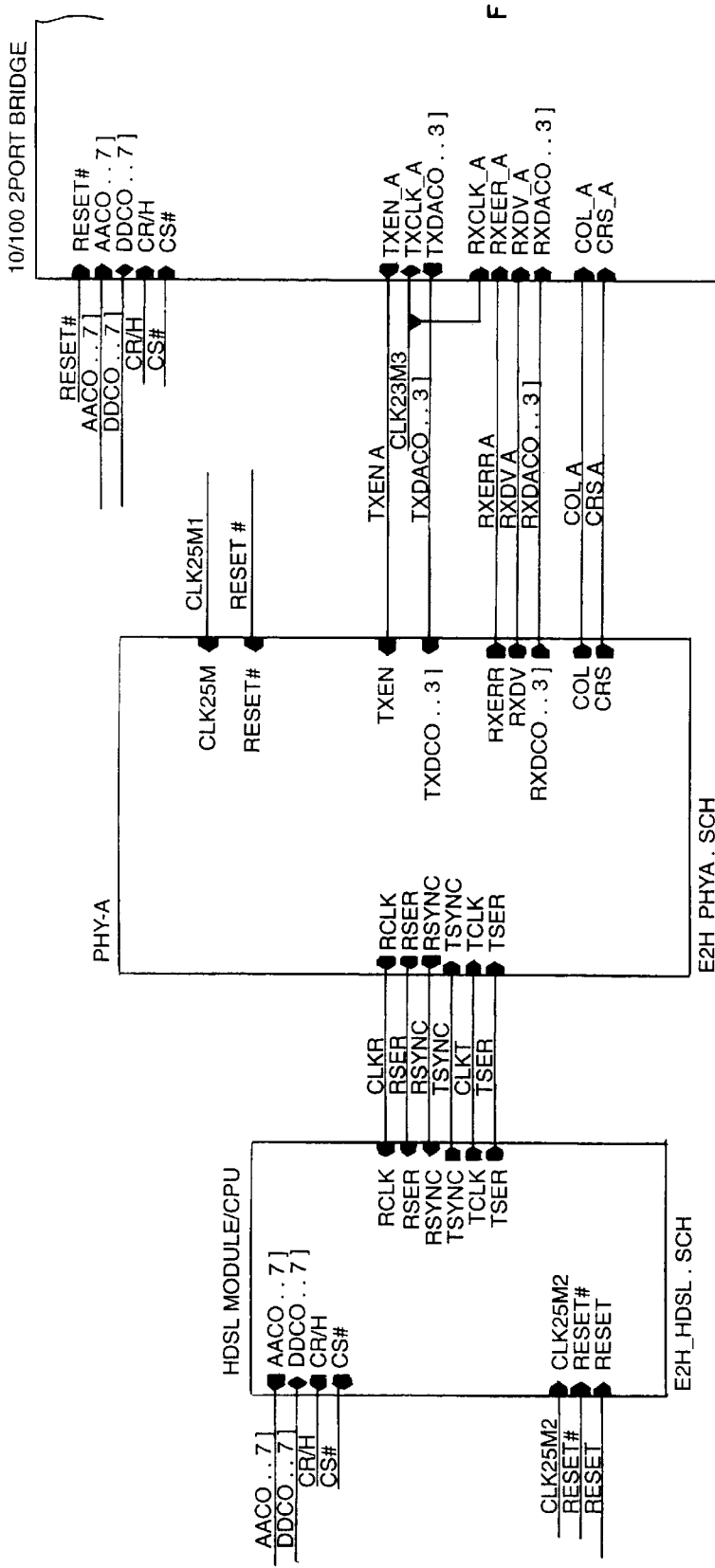
FIGS. 8a and 8b show specific pin connections for the Ethernet to HDSL Bridge.
Figure 8B:
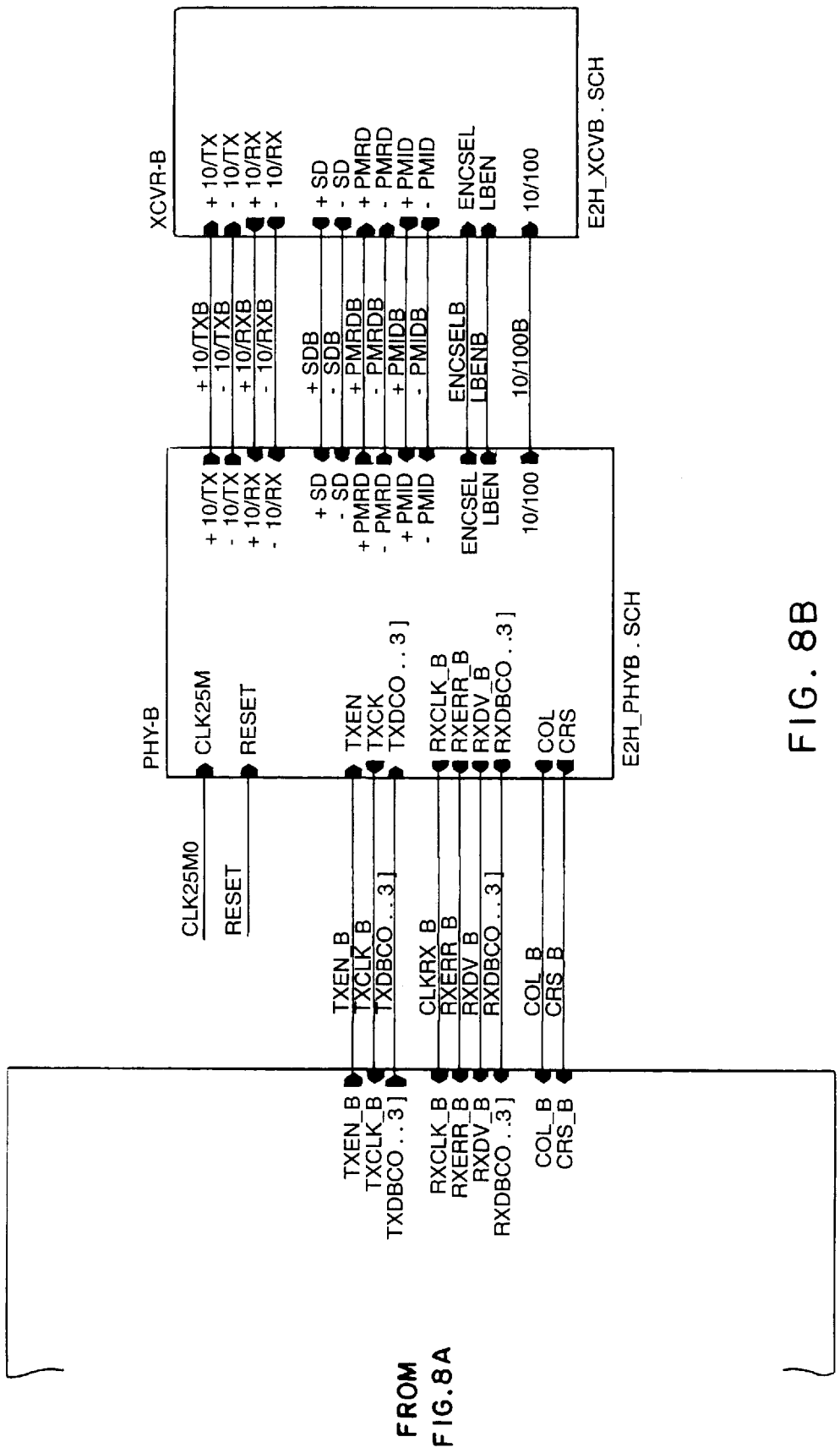
Figure 9C:
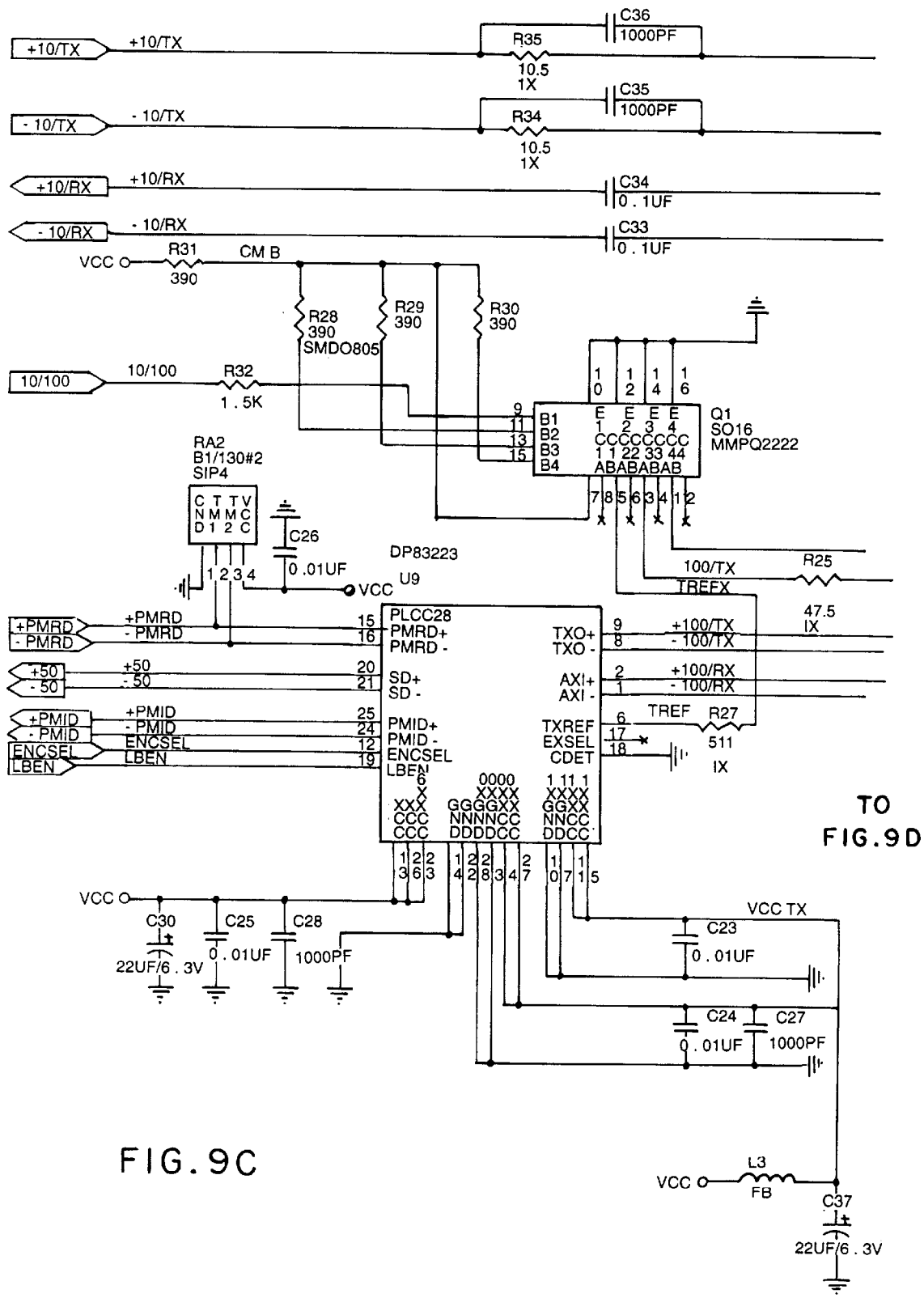
Figure 9D:
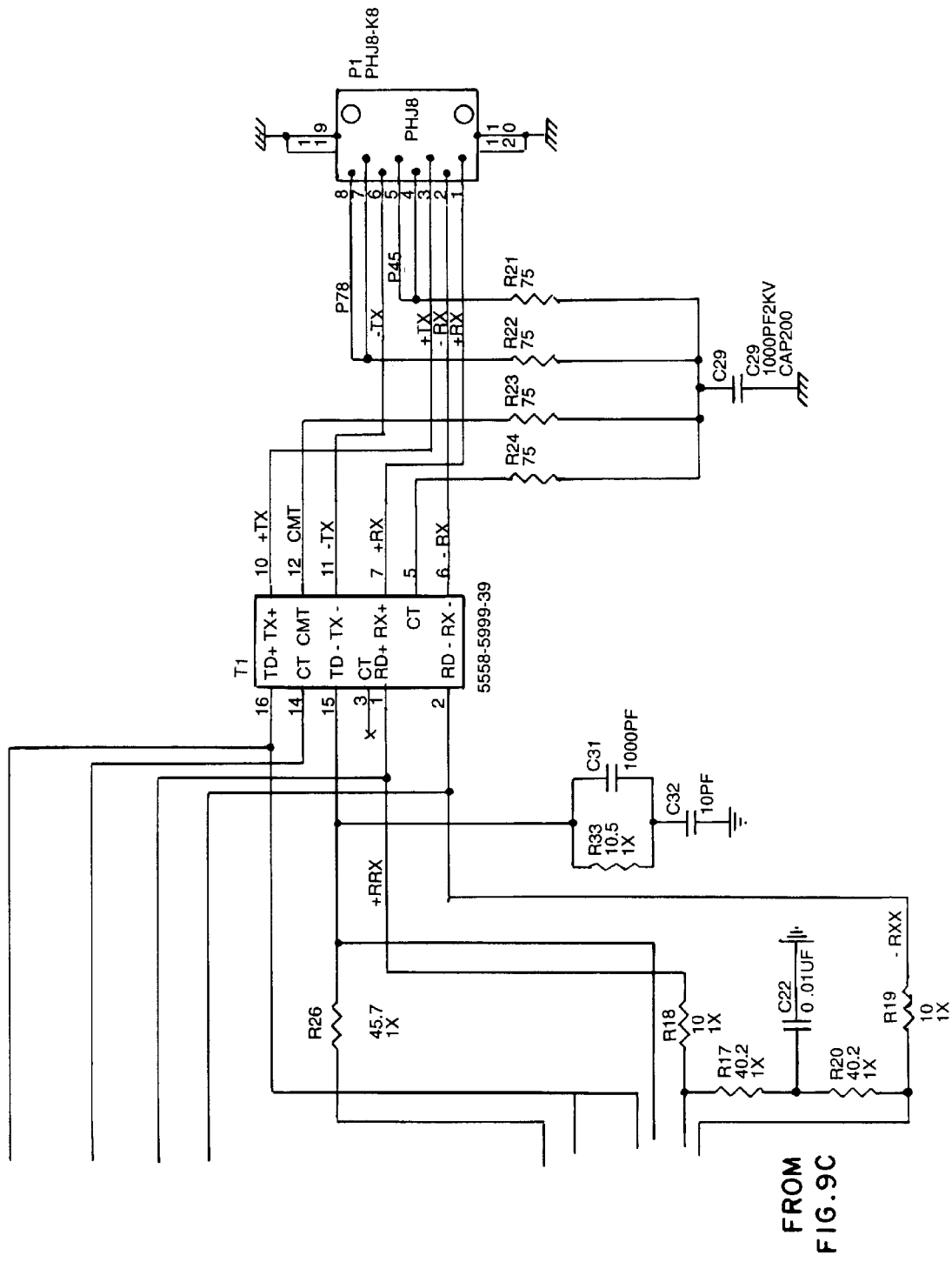
Figure 11A:
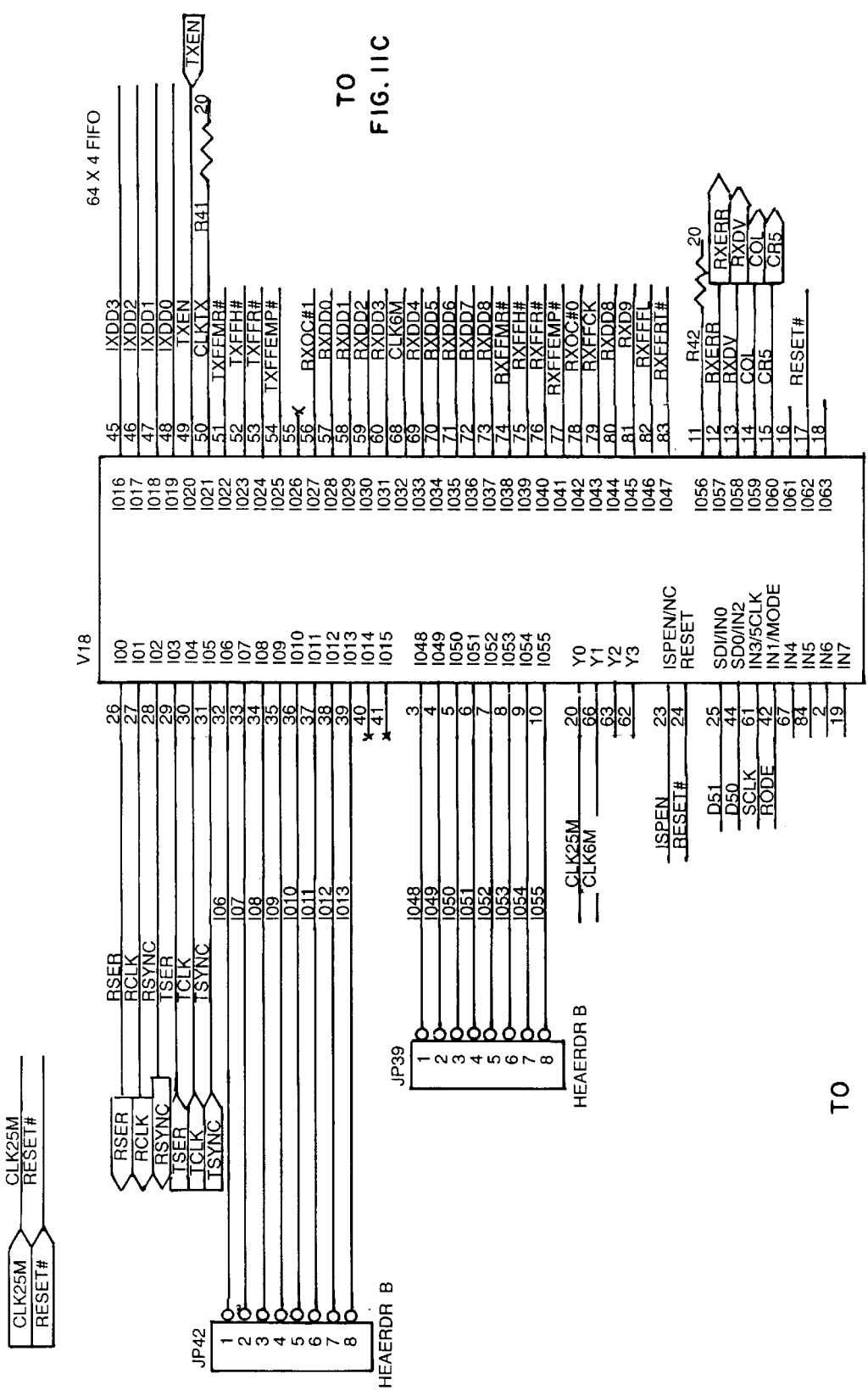
Figure 12D:
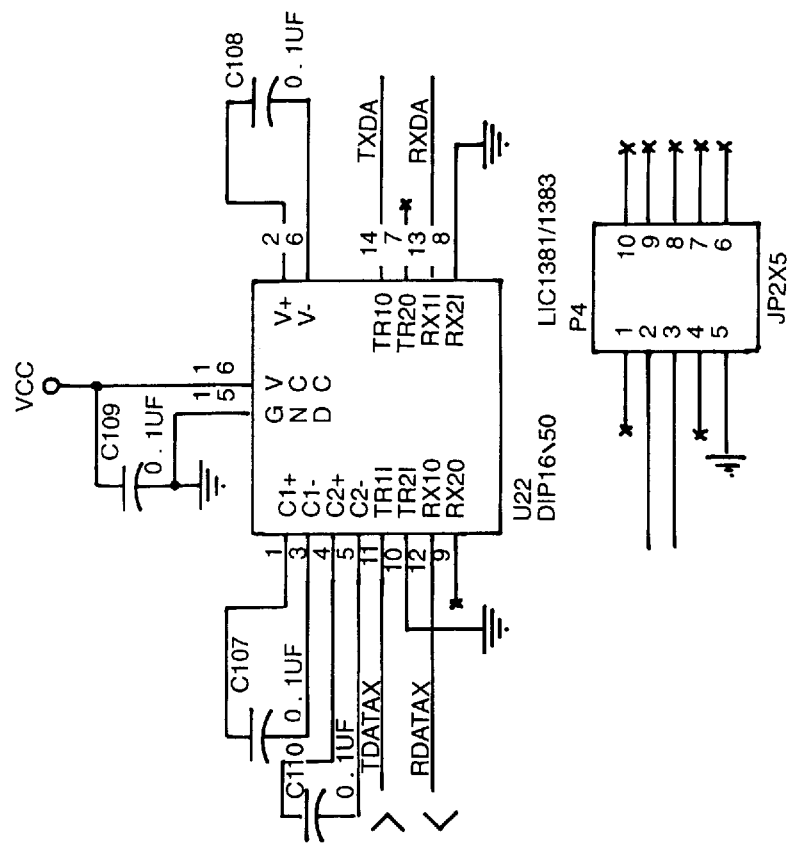
Figure 13A:
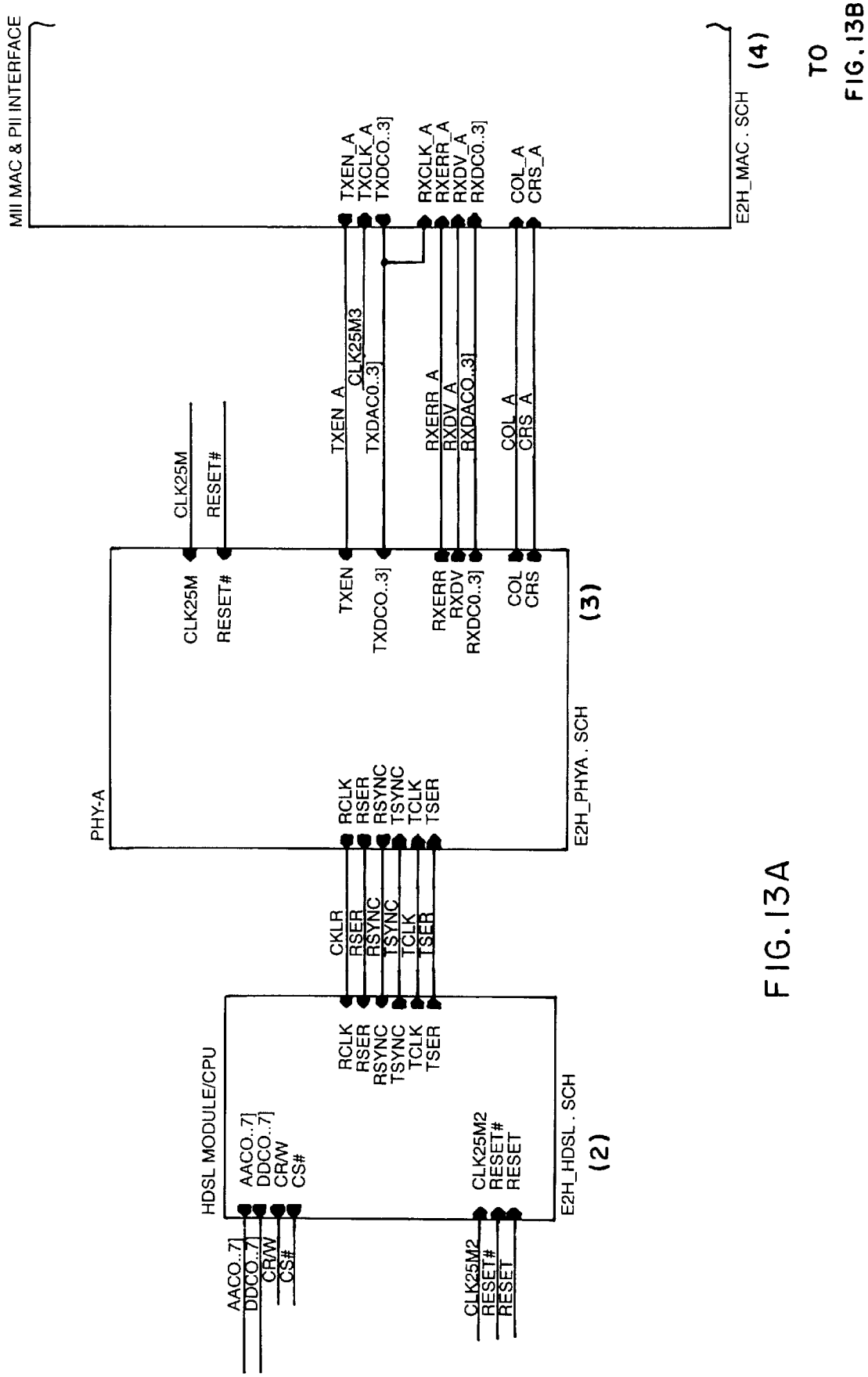
Figure 14A:
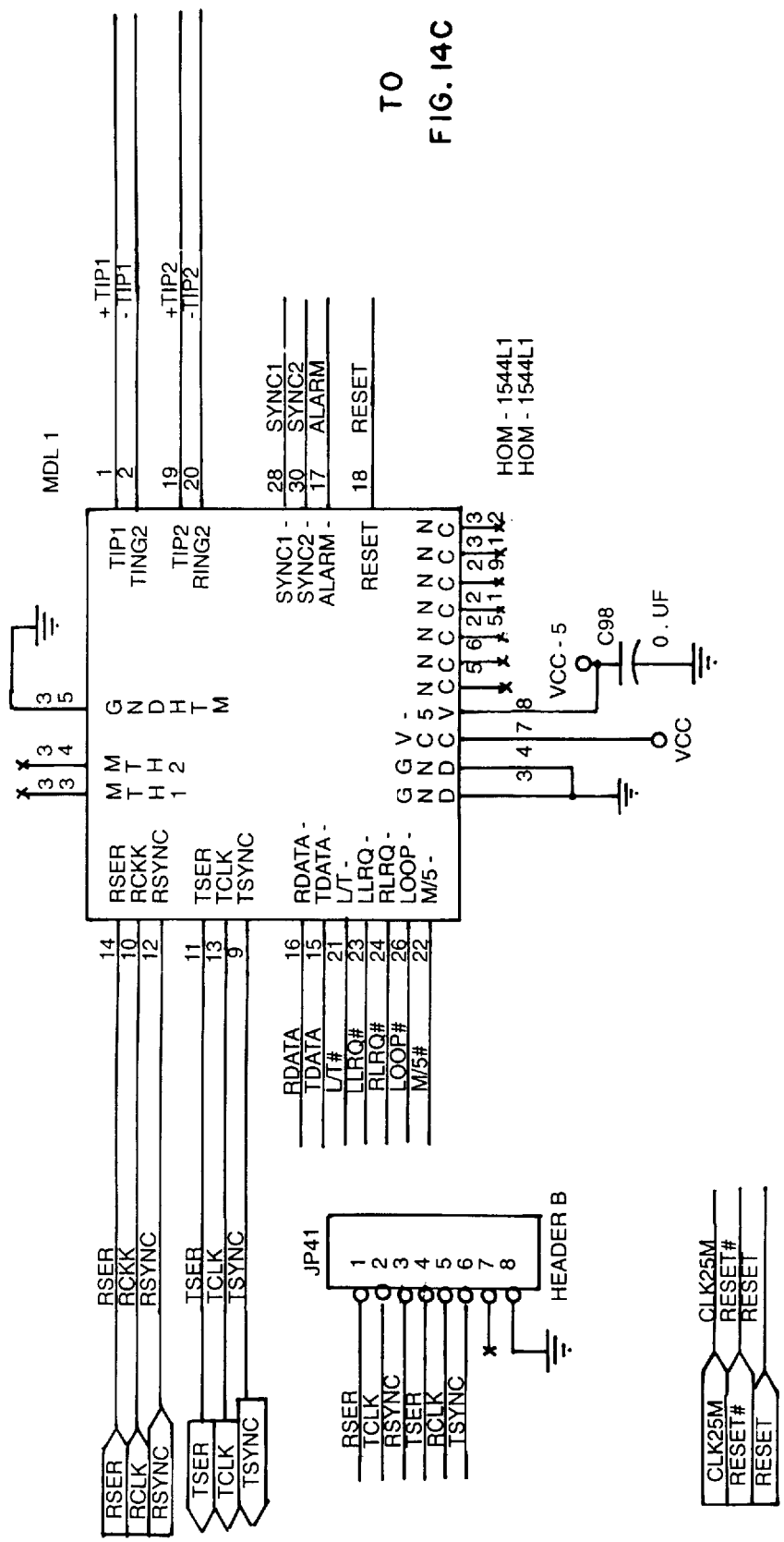
Figure 15A:
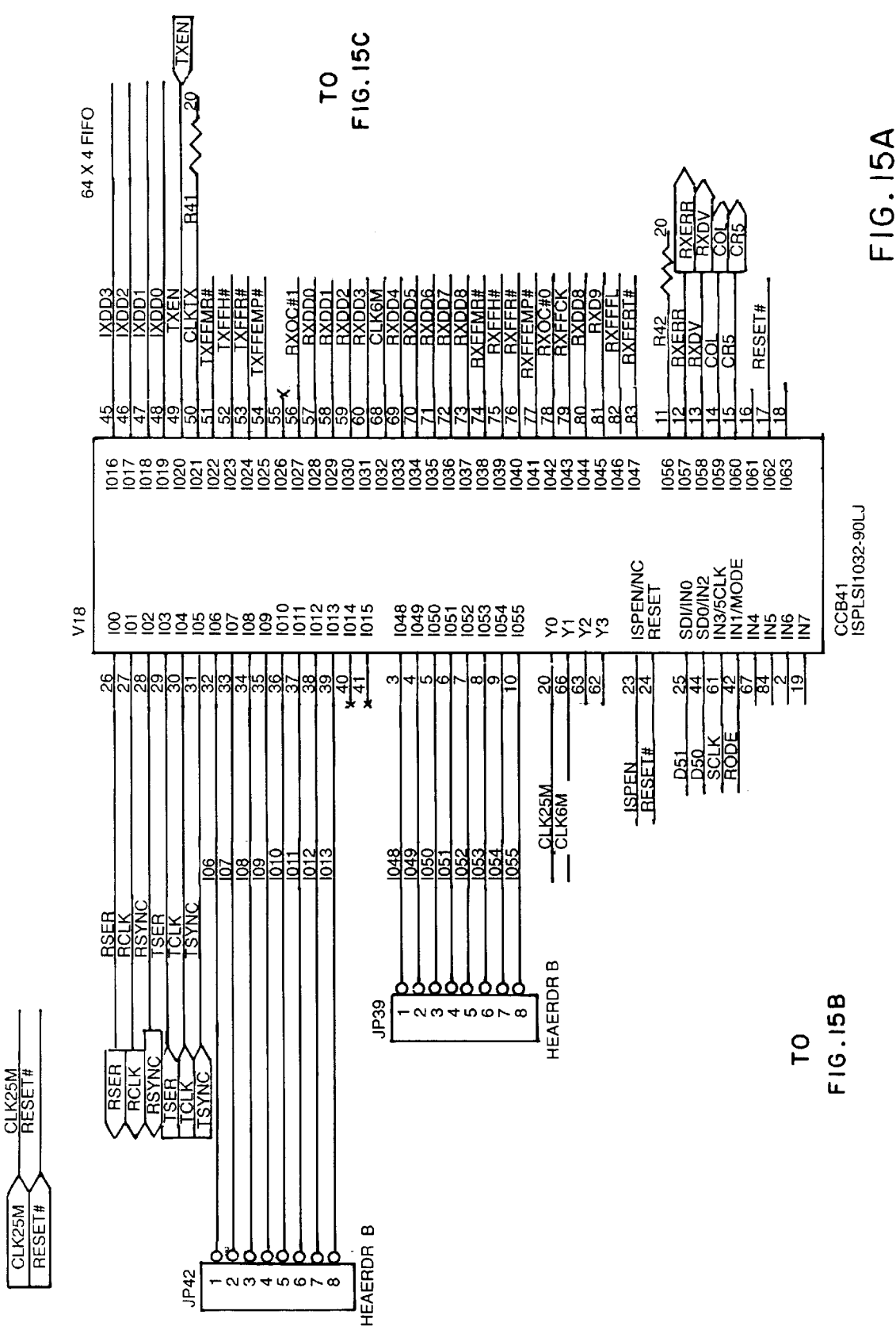
Figure 15C:
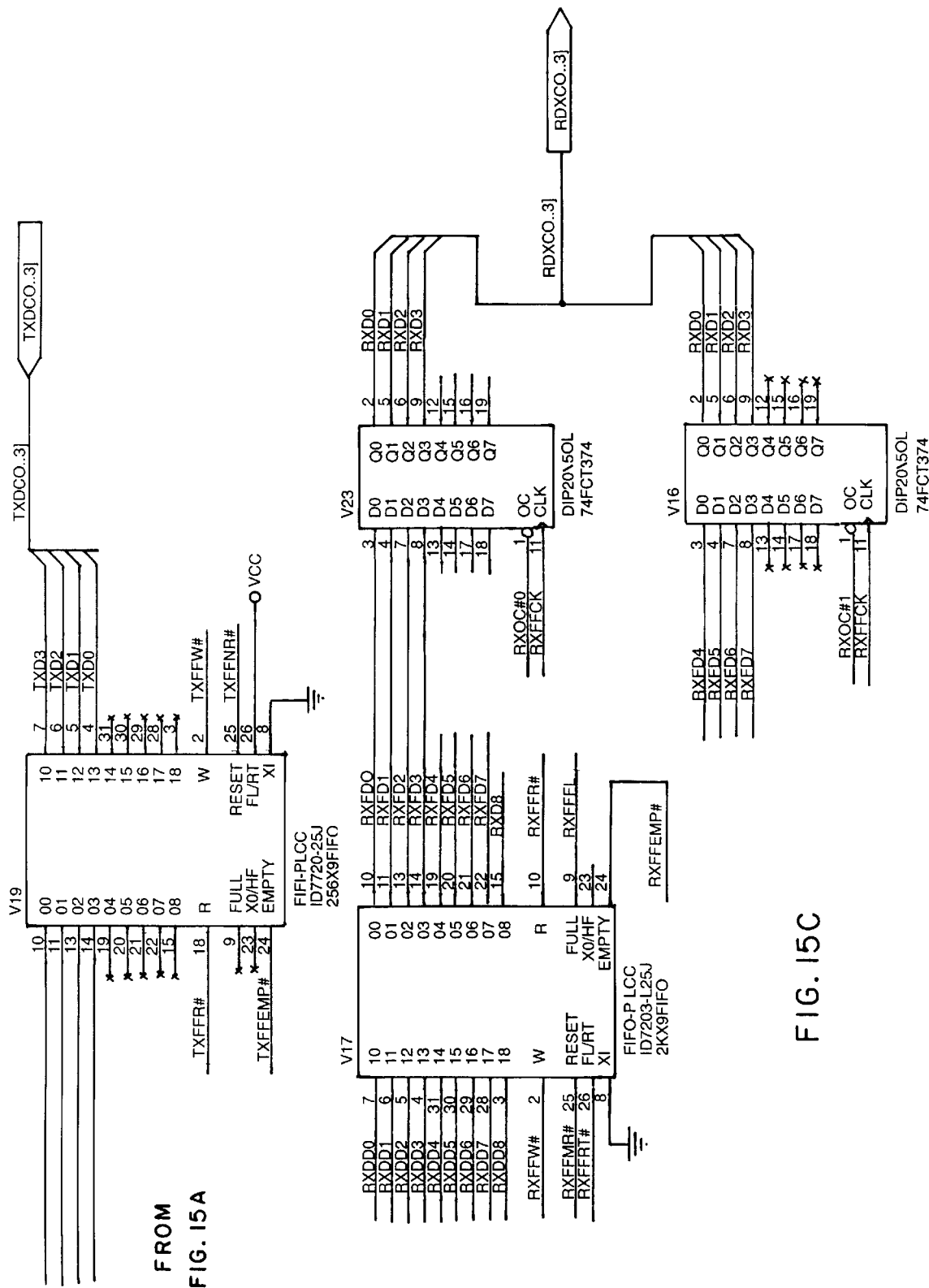
Figure 16A:
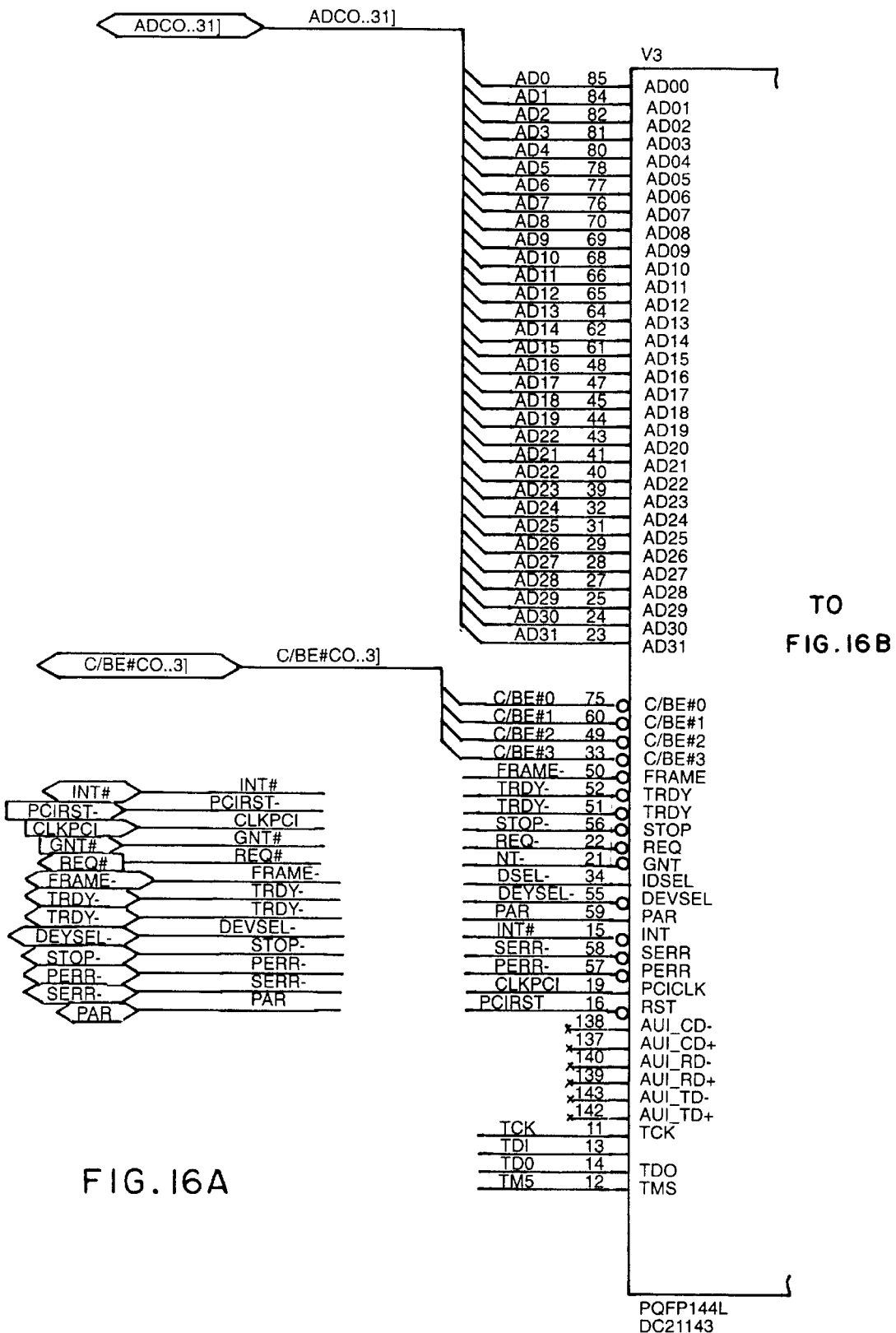
FIGS. 16a and 16b show specific pin connections for the 2 Port Bridge.
Figure 16B:
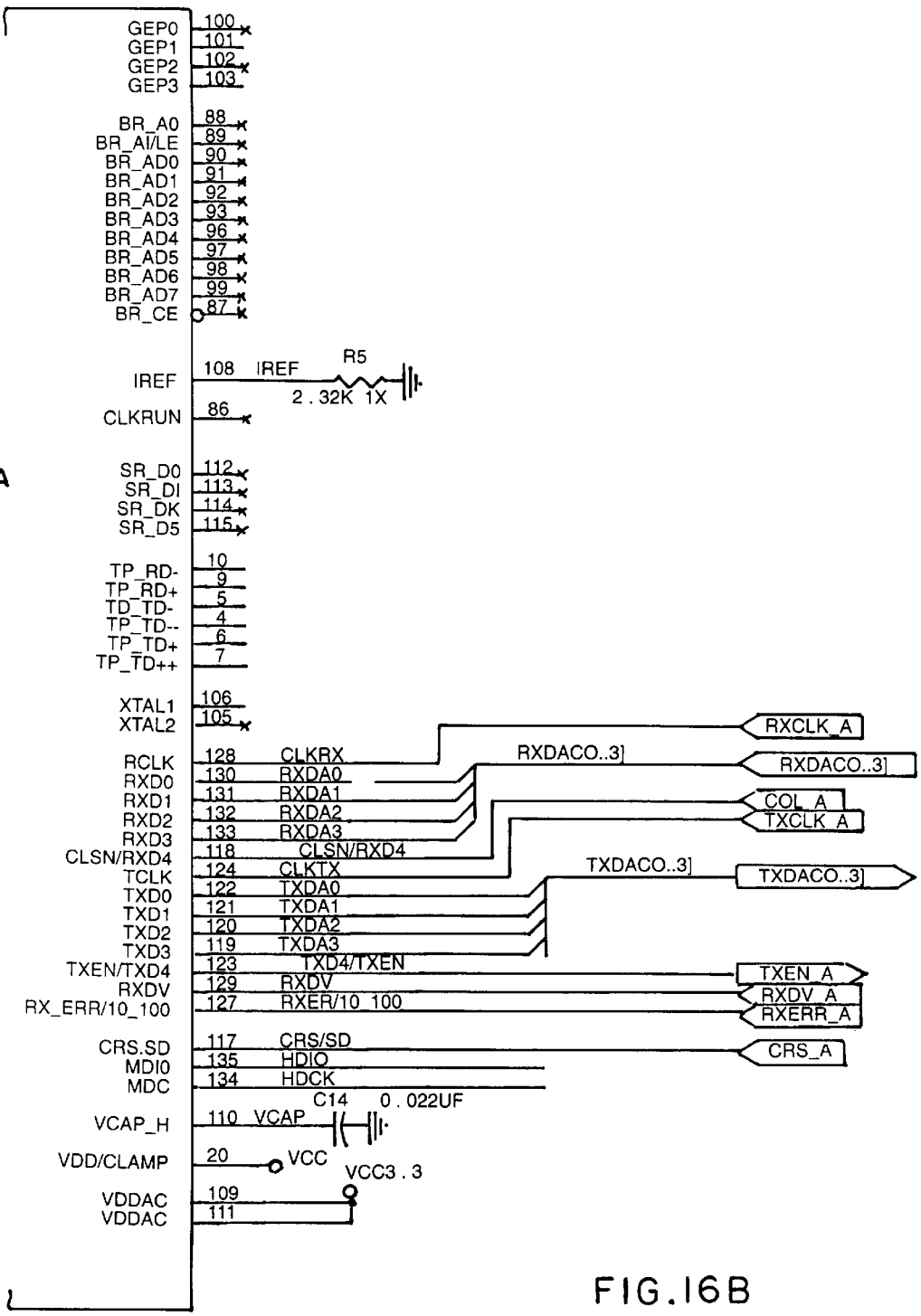
Figure 17B:
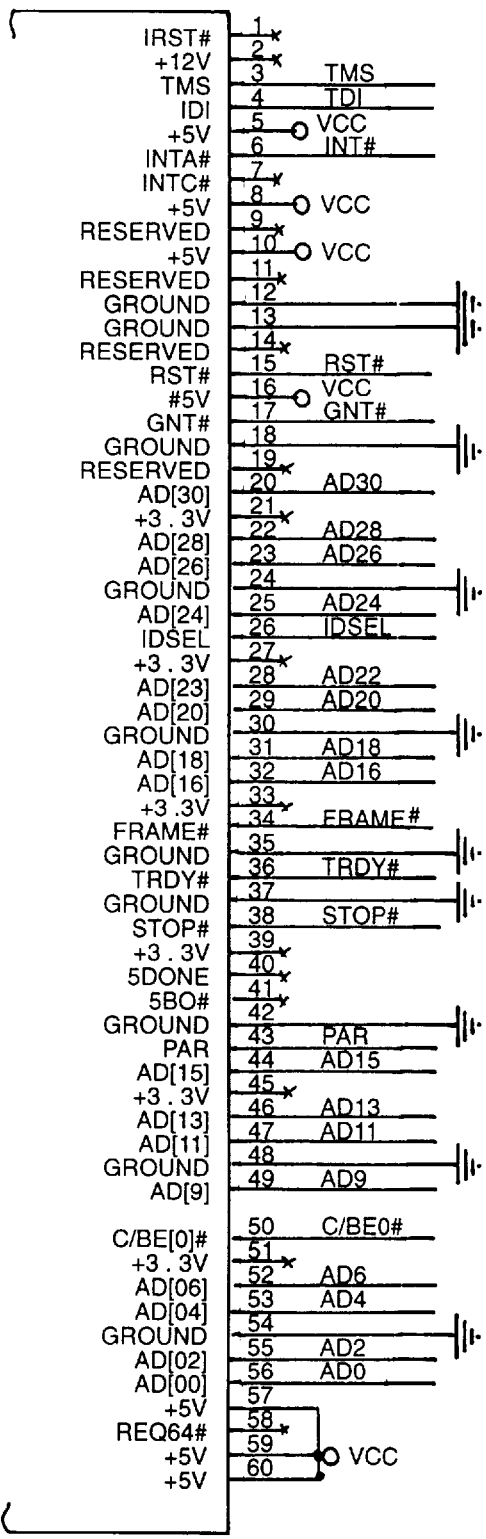

Referring to FIG. 7, there is shown another embodiment of the present invention. Ethernet MII to T1/E1 HDSL interface 54, T1/E1 HDSL interface 56 and twisted pair T1/E1 HDSL line 14 function in the same manner as hereinabove described for the embodiment depicted in FIG. 2. However, rather than having Ethernet port 40 and buffer memories 50, 52 coupled to Ethernet MII to T1/E1 HDSL interface 54, Ethernet MAC and PCI bus interface 80 can provide and receive the Ethernet MII formatted data. Ethernet MAC and PCI bus interface 80 can be implemented using Digital Equipment Corporation model DC221143 MAC, whose characteristics are set forth in the DECchip 21140A PCI Fast Ethernet LAN Controller Hardware Reference Manual dated October 1995 and is incorporated herein by reference. The use of this embodiment allows the Ethernet—T1/E1 HDSL converter to be able to be connected to in both transmit and receive modes and utilize the popular PCI bus which may be attached to a personal computer processor and memory.

To further aid in the understanding of the present invention, included in FIGS. 8–17 are specific pin connections used in practicing the preferred embodiment of the present invention utilizing components described herein and the documents incorporated herein by reference.

---

APPENDIX A

Brief Description of T1-Framing and E1-Framing:
1. T1-Framing:  T1 in commonly used in the North American
                Telecommunication industry.
    T1 clock rate: 1.544 Mhz
    T1 Framing:
        8-bit per time slot.
        24 time slots in each frame.
        1 bit synchronization.
        Total bit per frame: 1 + 8*24 = 193 bit
        time slot frequency 8,000/s
        193 * 8000 = 1.544 Mhz

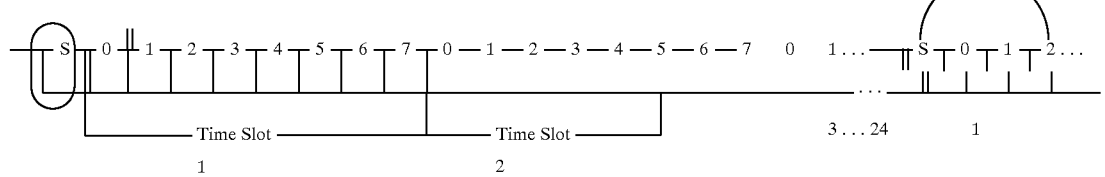

2. E1-Framing:  E1 in commonly used in the Europe Telecommunication
                industry.
    E1 clock rate: 2.048 Mhz
    E1 Framing:
        8-bit per time slot.
        32 time slots in each frame.
        synchronization on each time slot 0.
        Total bit per frame: 8*32 = 256 bit
        time slot frequency 8,000/s
        256 * 8000 = 2.048 Mhz

```
┌─7─┬─0─┬─1─┬─2─┬─3─┬─4─┬─5─┬─6─┬─7─┬─0─1─2─3─4─5─6─7    0  1...  ┌─0─┬─1─┬─2─┬─3...

└──────── Time Slot ────────┘└──── Time Slot ────┘      3...32      1
                       1                      2
                  Synchronization                                        Sync.
```

3. Converting Ethernet Packet to HDSL/T1/E1 framing:

3.1 Ethernet to T1:
    In the 193-bit frame, 192 bits are the payload.
    An Active Ethernet Byte (AEB) is composed of:
        Bit-0: Data Valid (DV) bit
        Bit-1 to Bit-8: Ethernet Data (ED)
    If Ethernet is active then turn on the Data Valid bit follow
    with the Ethernet Byte.
    So the T1 frame will be fit with AEB in the following way:

Bit-0:       Sync-bit
Bit-1 to Bit-2: Not used
(AEB-0)    Bit-3,4,5,6,7,8,9,10,11 as DV bit and 8-bit ED.
(AEB-1)    ...................
(AEB-20)   Bit-184,185,186,187,188,189,190,191,192

3.2 Ethernet to E1:
    In the 256-bit frame, 248 bits are the payload.
    An Active Ethernet Byte (AEB) is composed of:
        Bit-0: Data Valid (DV) bit
        Bit-1 to Bit-8: Ethernet Data (ED)
    If Ethernet is active then turn on the Data Valid bit follow
    with the Ethernet Byte.
    So the T1 frame will be fit with AEB in the following way:
    Bit-0 to Bit-7:     Synchronization and Maintenance.
    Bit-8 to Bit-12:Not used
    (AEB-0)     Bit-13 to Bit-21 as DV bit and 8-bit ED.
    (AEB-1)     ..................
    (AEB-26)    Bit-247,248,249,250,251,252,253,254,255

3. Ethernet-To-HDSL/T1/E1 FIFO control Algorithm:
Ethernet Transmitting from MII bus to HDSL/T1/E1:
    If TXEN asserted from MII and (TX_FIFO_EMPTY and CRS is
    cleared) then start receiving data from TXD[0..3] to TX_FIFO
    and send to HDSL immediately after 2 clocks. These 2 clocks is
    the safety buffer.
    The CRS to MII shall follow indicating transmitting is in
    progress.
    IF TXEN just asserted and TX_FIFO_NOT_EMPTY then send CRS
    follow with COL to MII. saying TX_FIFO is still sending do
    not send any more until the TX_FIFO_EMPTY.
Ethernet MII Receiving from HDSL/T1/E1:
    Whenever there is a Data_Valid bit in HDSL/T1/E1 stream then
    write the following byte into RCV_FIFO with Data_valid bit
    (9th-bit) to FIFO)
    When Data Valid bit is off indicating a FULL_PACKET has been
    received then write a GAP_byte(0,1111,1111) into the RCV_FIFO
    immediately then start to Read from RCV_FIFO to the Ethernet
    MII.
    IF there is a FULL_PACKET in RCV_FIFO and TXEN is not active
    then assert the CRS to MII, then start to read from
    RCV_FIFO.
    While reading from the RCV_FIFO Check the Data_Valid bit, it
    always begin with active. The RXDV shall be followed with
    RXFFCK1 to Latches and the RXOC0#, RXOC1#.
    If hit the GAP_Byte then deassert the RXDV.
    Wait 96-bit time (100 Mhz) then start to send the next packet
    if there is any (indicating by FULL_PACKET)

APPENDIX B(1)

Desciption of the flow chart:
    1. Data Transmission from MII to HDSL: (2 stages)
    (state machine implementation)
    First stage. MII to TX_FIFO:
    If TXEN from MII and TX_FIFO_EMPTY then start receiving to
    FIFO and send to HDSL immediately.
    Send the CRS to MII indicating transmitting.
    IF TXEN and TX_FIFO_NOT_EMPTY then then send COL to MII to
    inform the Ethernet MII that FIFO is still sending do not send
    any more.
    Send the Packet until the TXEN invalid.
    Second stage: TX_FIFO to HDSL transmission:
    If TX FIFO not EMPTY then pack 2 4-bit MII TXD[0..3] to an 8- bit data.
Fit the packed 8-bit data to the HDSL/T1/E1 framing serially
with DATA_VALID bit on the first bit followed with the 8-bit
data.
Send until the TX_FIFO is EMPTY.

APPENDIX B(2)

Data Reception from HDSL to MII: (2 stages)
  (state machine implementation)
First stage. HDSL to RX_FIFO:
Ethernet Receiving from HDSL:
  If the DATA_VALID bit in HDSL/T1/E1 frame first showed up then
  Start to receive an Ethernet Packet.
  Whenever there is a Data_Valid bit in HDSL/T1/E1 frame then
  write them to RCV_FIFO with DATA_VALID bit (9th-bit) to
  RX_FIFO.
  When the DATA_VALID bit is off indicating a FULL_PACKET has
  recevied then write the Packet_GAP_Byte(0,1111,1111) in the
  FIFO.
  Then inform the RX_FIFO_TO_MII state machine to start to read
  the RX_FIFO.
Second stage: RX_FIFO to MII transmission:
  IF there is a FULL_Packet in RCV_FIFO and TXEN is not active
  then assert CRS followed with RXD_V to MII, then start to read
  from RCV_FIFO.
  IF TXEN is active until TXEN is done.
  Read a byte from RX_FIFO unpack it into 2 4-bit RXD[0..3] data
  and send to MII.
  Check if the DATA_VALID bit is "0" when read, if yes then stop
  reading from RX_FIFO.

I claim:

1. A method of converting received 10/100-Base Ethernet packets to T1 HDSL frames, comprising the steps of:
    receiving and converting Ethernet format 4 bit MII data packets into 9 bit packets, each 9 bit packet having 8 data bits and an associated signal bit;
    combining a series of twenty-one 9 bit packets with three pass bits into a 192 bit T1 HDSL frame; and
    transmitting the series of twenty-one multiple 9 bit packets with three pass bits in T1 HDSL format.

2. A method of converting received 10/100-Base Ethernet packets to E1 HDSL frames, comprising the steps of:
    receiving and converting Ethernet format 4 bit MII data packets into into 9 bit packets, each 9 bit packet having 8 data bits and an associated signal bit;
    combining a series of twenty-seven 9 bit packets with five pass bits into a 256 bit E1 HDSL frame; and
    transmitting the series of twenty-seven multiple 9 bit packets with five pass bits in E1 HDSL format.

3. A method of converting received T1 HDSL frames into 10/100-Base Ethernet packets comprising the steps of:
    receiving the T1 HDSL frames having a series of twenty-one 9 bit packets, each 9 bit packet including 8 data bits with an associated signal bit, and three pass bits;
    converting the series of twenty-one 9 bit packets and three pass bits into twenty-one groups of 9 bit packets, each 9 bit packet including the 8 data bits with the associated signal bit, each group of 9 bit packets being in Ethernet Media Independent Interface (MII) format;
    converting each group of 8 data bits into a 4 bit MII data packet; and
    transmitting each 4 bit MII data packet in 10/100-Base Ethernet packet format.

4. A method of converting received E1 HDSL frames into 10/100-Base Ethernet packets comprising the steps of:
    receiving the E1 HDSL frames having a series of twenty-seven 9 bit packets, each 9 bit packet including 8 data bits with an associated signal bit, and five pass bits;
    converting the series of twenty-seven 9 bit packets and five pass bits into twenty-seven groups of 9 bit packets, each 9 bit packet including the 8 data bits with an associated signal bit, each group of 9 bit packets being in Ethernet Media Independent Interface (MII) format;
    converting each group of 8 data bits into a 4 bit MII data packet; and
    transmitting each 4 bit MII data packet in 10/100-Base Ethernet packet format.

5. A 10/100-Base Ethernet to T1 HDSL converter comprising:
    first conversion means for converting the Ethernet format 4 bit Media Independent Interface (MII) first series data packets into 9 bit first series packets, each 9 bit first series packet including an 8 bit first series data packet and a first series associated signal bit;
    combining-decombining means coupled to the first conversion means for combing a first group of twenty-one multiple 9 bit first series packets with three first series pass bits into a 192 bit first T1 HDSL frame, said combining-decombining means including:
      means for transmitting the first group of twenty-one multiple 9 bit first series packets and three first series pass bits in T1 HDSL format,
      means for receiving a second group of twenty-one multiple 9 bit second series packets, each 9 bit second series packet including an 8 bit second series data packet and a second series associated signal bit, combined with three second series pass bits, and
      means for transmitting a second series 4 bit MII packet in 10/100-Base Ethernet packet format; and
    second conversion means coupled to said combining-decombining means for converting the second group of twenty-one multiple 9 bit second series packets and second series pass bits into twenty-one second series 9 bit packets, each second series 9 bit packet including the 8 bit second series data packet and the second series associated signal bit, and for converting each 8 bit second series data packet into a 4 bit MII second series data packet.

6. The 10/100-Base Ethernet to T1 HDSL converter as set forth in claim 5 wherein the first conversion means includes a 4 to 8 demultiplexer for receiving the Ethernet format 4 bit MII first series data packets and a transmit FIFO coupled between the 4 to 8 demultiplexer and the combining-decombining means for storing the 8 bit first series data packet.

7. The 10/100-Base Ethernet to T1 HDSL converter as set forth in claim 5 wherein the second conversion means includes a 8 to 4 multiplexer for transmitting the Ethernet format 4 bit MII first series data packets and a receive FIFO coupled between the 8 to 4 multiplexer and the combining-decombining means for storing the 8 bit second series data packet.

8. A 10/100-Base Ethernet to E1 HDSL converter comprising:

first conversion means for converting the Ethernet format 4 bit Media Independent Interface (MII) first series data packets into 9 bit first series packets, each 9 bit first series packet including an 8 bit first series data packet and a first series associated signal bit;

combining-decombining means coupled to the first conversion means for combing a first group of twenty-seven multiple 9 bit first series packets with five first series pass bits into a 256 bit first E1 HDSL frame, said combining-decombining means including:
means for transmitting the first group of twenty-seven multiple 9 bit first series packets and five first series pass bits in E1 HDSL format,
means for receiving a second group of twenty-seven multiple 9 bit second series packets, each 9 bit second series packet including an 8 bit second series data packet and a second series associated signal bit, combined with five second series pass bits, and
means for transmitting a second series 4 bit MII packet in 10/100-Base Ethernet packet format; and second conversion means coupled to said combining-decombining means for converting the second group of twenty-seven multiple 9 bit second series packets and second series pass bits into twenty-seven second series 9 bit packets, each second series 9 bit packet including the 8 bit second series data packet and the second series associated signal bit, and for converting each 8 bit second series data packet into a 4 bit MII second series data packet.

9. The 10/100-Base Ethernet to E1 HDSL converter as set forth in claim 8 wherein the first conversion means includes a 4 to 8 demultiplexer for receiving the Ethernet format 4 bit MII first series data packets and a transmit FIFO coupled between the 4 to 8 demultiplexer and the combining-decombining means for storing the 8 bit first series data packet.

10. The 10/100-Base Ethernet to E1 HDSL converter as set forth in claim 8 wherein the second conversion means includes a 8 to 4 multiplexer for transmitting the Ethernet format 4 bit MII first series data packets and a receive FIFO coupled between the 8 to 4 multiplexer and the combining-decombining means for storing the 8 bit second series data packet.

11. An Ethernet to T1 HDSL converter connectable to a PCI bus comprising:

first conversion means for converting Ethernet format 4 bit Media Independent Interface (MII) first series data packets into 9 bit first series packets, each 9 bit first series packet including an 8 bit first series data packet and a first series associated signal bit, said first conversion means including first means for coupling in transmission mode said first conversion means to the PCI bus;

combining-decombining means coupled to the first conversion means for combing a first group of twenty-one multiple 9 bit first series packets with three first series pass bits into a 192 bit first T1 HDSL frame, said combining-decombining means including:
means for transmitting the first group of twenty-one multiple 9 bit first series packets and three first series pass bits in T1 HDSL format,
means for receiving a second group of twenty-one multiple 9 bit second series packets, each 9 bit second series packet including an 8 bit second series data packet and a second series associated signal bit, combined with three second series pass bits, and
means for transmitting a second series 4 bit MII data packet in Ethernet packet format; and second conversion means coupled to said combining-decombining means for converting the second group of twenty-one multiple 9 bit second series packets and second series pass bits into twenty-one second series 9 bit packets, each second series 9 bit packet including the 8 bit second series data packet and the second series associated signal bit, and for converting each 8 bit second series data packet into a 4 bit MII second series data packet, said second conversion means including second means for coupling in receive mode said second conversion means to the PCI bus.

12. The Ethernet to T1 HDSL converter as set forth in claim 11 wherein the first conversion means includes a 4 to 8 demultiplexer for receiving the Ethernet MII format 4 bit MII first series data packets and a transmit FIFO coupled between the 4 to 8 demultiplexer and the combining-decombining means for storing the 8 bit first series data packet.

13. The Ethernet to T1 HDSL converter as set forth in claim 11 wherein the second conversion means includes a 8 to 4 multiplexer for transmitting the Ethernet format 4 bit MII first series data packets and a receive FIFO coupled between the 8 to 4 multiplexer and the combining-decombining means for storing the 8 bit second series data packet.

14. An Ethernet to E1 HDSL converter connectable to a PCI bus comprising:

first conversion means for converting Ethernet format 4 bit Media Independent Interface (MII) first series data packets into 9 bit first series packets, each 9 bit first series packet including an 8 bit first series data packet and a first series associated signal bit, said first conversion means including first means for coupling in transmission mode said first conversion means to the PCI bus;

combining-decombining means coupled to the first conversion means for combing a first group of twenty-seven multiple 9 bit first series packets with five first series pass bits into a 256 bit first E1 HDSL frame, said combining-decombining means including:
means for transmitting the first group of twenty-seven multiple 9 bit first series packets and five first series pass bits in E1 HDSL format,
means for receiving a second group of twenty-seven multiple 9 bit second series packets, each 9 bit second series packet including an 8 bit second series data packet and a second series associated signal bit, combined with five second series pass bits, and
means for transmitting a second series 4 bit MII data packet in Ethernet packet format; and second conversion means coupled to said combining-decombining means for converting the second group of twenty-seven multiple 9 bit second series packets and second series pass bits into twenty-seven second series 9 bit packets, each second series 9 bit packet including the 8 bit second series data packet and the second series associated signal bit, and for converting each 8 bit second series data packet into a 4 bit MII second series data packet, said second conversion means including second means for coupling in receive mode said second conversion means to the PCI bus.

15. The Ethernet to E1 HDSL converter as set forth in claim 14 wherein the first conversion means includes a 4 to 8 demultiplexer for receiving the Ethernet MII format 4 bit MII first series data packets and a transmit FIFO coupled between the 4 to 8 demultiplexer and the combining-decombining means for storing the 8 bit first series data packet.

16. The Ethernet to E1 HDSL converter as set forth in claim 14 wherein the second conversion means includes a 8 to 4 multiplexer for transmitting the Ethernet format 4 bit MII first series data packets and a receive FIFO coupled between the 8 to 4 multiplexer and the combining-decombining means for storing the 8 bit second series data packet.

* * * * *